United States Patent
Christoph

(10) Patent No.: US 12,158,901 B2
(45) Date of Patent: Dec. 3, 2024

(54) FAST TABLE SEARCH FOR VISUALIZATION OF COMPLEX HIERARCHY DATA

(71) Applicant: SAP SE, Walldorf (DE)

(72) Inventor: Bjoern Christoph, Oberhausen-Rheinhausen (DE)

(73) Assignee: SAP SE, Walldorf (DE)

(*) Notice: Subject to any disclaimer, the term of this patent is extended or adjusted under 35 U.S.C. 154(b) by 203 days.

(21) Appl. No.: 17/727,360

(22) Filed: Apr. 22, 2022

(65) Prior Publication Data
US 2023/0177046 A1 Jun. 8, 2023

Related U.S. Application Data

(63) Continuation-in-part of application No. 17/545,727, filed on Dec. 8, 2021, now Pat. No. 11,954,134.

(60) Provisional application No. 63/312,342, filed on Feb. 21, 2022.

(51) Int. Cl.
*G06F 16/28* (2019.01)
*G06F 16/22* (2019.01)
*G06F 16/2453* (2019.01)
*G06F 16/26* (2019.01)

(52) U.S. Cl.
CPC ........ *G06F 16/289* (2019.01); *G06F 16/2282* (2019.01); *G06F 16/26* (2019.01); *G06F 16/221* (2019.01); *G06F 16/2255* (2019.01); *G06F 16/2453* (2019.01)

(58) Field of Classification Search
CPC ............. G06F 16/2453; G06F 16/2221; G06F 16/2255; G06F 16/221; G06F 16/2282
See application file for complete search history.

(56) References Cited

U.S. PATENT DOCUMENTS

| | | | |
|---|---|---|---|
| 8,671,111 B2* | 3/2014 | Dantressangle | G06F 16/2228 707/804 |
| 9,251,197 B2* | 2/2016 | Raufman | G06F 16/2365 |
| 9,672,272 B2* | 6/2017 | Grondin | G06F 16/24556 |

(Continued)

OTHER PUBLICATIONS

"Allocation Cycle," SAP Documentation, https://help.sap.com/doc/3c51d7531a4d424de10000000a174cb4/2.6/en-US/fa4ed7531a4d424de10000000a174cb4.html, printed Nov. 24, 2021, 2 pages.

(Continued)

*Primary Examiner* — Miranda Le
(74) *Attorney, Agent, or Firm* — Klarquist Sparkman, LLP

(57) ABSTRACT

A computer-implemented method can receive a search query to search a database table comprising data values organized in rows and columns. The search query includes one or more search entries that specify column names and search criteria associated with the column names. The method can generate hash tables corresponding to selected columns of the database table. A hash table includes hash values and tuples respectively mapped to the hash values. The hash values are unique data values in a selected column of the database table. A tuple includes one or more row indexes corresponding to a specific hash value. Responsive to the search query, the method can search the hash tables to identify result row indexes. The result row indexes and the column names specified by the search entries can locate data values in the database table that satisfy the search criteria specified by the search entries.

15 Claims, 36 Drawing Sheets

(56) References Cited

U.S. PATENT DOCUMENTS

| | | | | |
|---|---|---|---|---|
| 10,162,598 | B2* | 12/2018 | Kaushik | G06F 7/24 |
| 10,558,659 | B2* | 2/2020 | Hopeman | G06F 16/2237 |
| 10,678,791 | B2* | 6/2020 | Chavan | G06F 16/24544 |
| 11,132,384 | B2* | 9/2021 | Gupta | G06F 16/283 |
| 2010/0088315 | A1* | 4/2010 | Netz | G06F 16/24561 |
| | | | | 707/E17.014 |
| 2014/0304275 | A1* | 10/2014 | Baskett | G06F 16/9014 |
| | | | | 707/769 |
| 2018/0089261 | A1* | 3/2018 | Li | G06F 16/2453 |
| 2019/0377743 | A1* | 12/2019 | Gupta | G06F 16/283 |
| 2020/0159707 | A1* | 5/2020 | Baskett | G06F 16/137 |
| 2023/0177036 | A1 | 6/2023 | Christoph | |

OTHER PUBLICATIONS

Christoph Bjoern, "Visual Iteration Analysis—Preview," SAP SE, Feb. 18, 2021, 24 pages.

Christoph Bjoern, "Visual Iteration Analysis—Preview," SAP SE, Jun. 2021, 14 pages.

"Cycle," SAP Documentation, https://help.sap.com/doc/2c11d553088f4308e10000000a174cb4/2.6/en-US/460dd553088f4308e10000000a174cb4.html, printed Nov. 24, 2021, 2 pages.

Kersten et al., "Everything you always wanted to know about compiled and vectorized queries but were afraid to ask," Proceedings of the VLDB Endowment, vol. 11, No. 13, 2209-2222, 2018.

Valentin et al., "Kleine Verbesserungen aus dem Controlling," SAP SE, Nov. 15, 2019, 19 pages (English translation included).

* cited by examiner

| Document Number (BELNR) | Creditor/Debtor indicator (BEKNZ) | Document item (ZLENR) | Posting Row (BUZEI) | Segment text (SGTXT) | Object Number (OBJNR) | Partner Object (PAROB1) | Value |
|---|---|---|---|---|---|---|---|
| 47533 | C | 1 | 1 | EXTERNAL | TELEKOM | C.K. | -3,000.00 |
| 47533 | D | 1 | 2 | EXTERNAL | C.K. | TELEKOM | 3,000.00 |
| 47533 | C | 2 | 3 | EXTERNAL | TELEKOM | T.S. | -2,500.00 |
| 47533 | D | 2 | 4 | EXTERNAL | T.S. | TELEKOM | 2,500.00 |
| 47533 | C | 3 | 5 | EXTERNAL | TELEKOM | L.M. | -5,000.00 |
| 47533 | D | 3 | 6 | EXTERNAL | L.M. | TELEKOM | 5,000.00 |
| 47533 | C | 4 | 7 | BOARD | T.S. | A.H. | -2,200.00 |
| 47533 | D | 4 | 8 | BOARD | A.H. | T.S. | 2,200.00 |
| 47533 | C | 5 | 9 | L1 | A.H. | K.L. | -2,000.00 |
| 47533 | D | 5 | 10 | L1 | K.L. | A.H. | 2,000.00 |
| 47533 | C | 6 | 11 | L2 | K.L. | U.R. | -1,750.00 |
| 47533 | D | 6 | 12 | L2 | U.R. | K.L. | 1,750.00 |
| 47533 | C | 7 | 13 | L3 | U.R. | J.F. | -800.00 |
| 47533 | D | 7 | 14 | L3 | J.F. | U.R. | 800.00 |
| 47533 | C | 8 | 15 | L3 | U.R. | M.V. | -700.00 |
| 47533 | D | 8 | 16 | L3 | M.V. | U.R. | 700.00 |
| 47533 | C | 9 | 17 | L3 | U.R. | C.L. | -100.00 |
| 47533 | D | 9 | 18 | L3 | C.L. | U.R. | 100.00 |
| 47533 | C | 10 | 19 | L4 | M.V. | A.M | -200.00 |
| 47533 | D | 10 | 20 | L4 | A.M | M.V. | 200.00 |
| 47533 | C | 11 | 21 | L4 | M.V. | A.N. | -50.00 |
| 47533 | D | 11 | 22 | L4 | A.N. | M.V. | 50.00 |
| 47533 | C | 12 | 23 | L4 | M.V. | A.P. | -70.00 |
| 47533 | D | 12 | 24 | L4 | A.P. | M.V. | 70.00 |
| 47533 | C | 13 | 25 | L4 | M.V. | K.M. | -150.00 |
| 47533 | D | 13 | 26 | L4 | K.M. | M.V. | 150.00 |
| 47533 | C | 14 | 27 | L4 | M.V. | A.H. | -20.00 |
| 47533 | D | 14 | 28 | L4 | A.H. | M.V. | 20.00 |

| Hash table: BEKNZ | |
|---|---|
| Hash value | Row indexes |
| C | 1, 3, 5, 7, 9, 11, 13, 15, 17, 19, 21, 23, 25, 27 |
| D | 2, 4, 6, 8, 10, 12, 14, 16, 18, 20, 22, 24, 26, 28 |

↖ 1110

| Hash table: BUZEI | |
|---|---|
| Hash value | Row indexes |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 16 |
| 17 | 17 |
| 18 | 18 |
| 19 | 19 |
| 20 | 20 |
| 21 | 21 |
| 22 | 22 |
| 23 | 23 |
| 24 | 24 |
| 25 | 25 |
| 26 | 26 |
| 27 | 27 |
| 28 | 28 |

↖ 1120

| Hash table: OBJNR | |
|---|---|
| Hash value | Row indexes |
| A.H. | 8, 9, 28 |
| A.M. | 20 |
| A.N. | 22 |
| A.P. | 24 |
| C.K. | 2 |
| C.L. | 18 |
| J.F. | 14 |
| K.L. | 10, 11 |
| K.M. | 26 |
| L.M. | 6 |
| M.V. | 16, 19, 21, 23, 25, 27 |
| T.S. | 4, 7 |
| TELECOM | 1, 3, 5 |
| U.R. | 12, 13, 15, 17 |

↖ 1130

| Hash table: PAROB1 | |
|---|---|
| Hash value | Row indexes |
| A.H. | 7, 10, 27 |
| A.M. | 29 |
| A.N. | 21 |
| A.P. | 23 |
| C.K. | 1 |
| C.L. | 17 |
| J.F. | 13 |
| K.L. | 9, 12 |
| K.M. | 25 |
| L.M. | 5 |
| M.V. | 15, 20, 22, 24, 26, 28 |
| T.S. | 3, 8 |
| TELECOM | 2, 4, 6 |
| U.R. | 11, 14, 16, 18 |

↖ 1140

| Hash table: SGTXT | |
|---|---|
| Hash value | Row indexes |
| Board | 7, 8 |
| EXTERNAL | 1, 2, 3, 4, 5, 6 |
| L1 | 9, 10 |
| L2 | 11, 12 |
| L3 | 13, 14, 15, 16, 17, 18 |
| L4 | 19, 20, 21, 22, 23, 24, 25, 26, 27, 28 |

↖ 1150

| Hash table: ZLENR | |
|---|---|
| Hash value | Row indexes |
| 1 | 1, 2 |
| 2 | 3, 4 |
| 3 | 5, 6 |
| 4 | 7, 8 |
| 5 | 9, 10 |
| 6 | 11, 12 |
| 7 | 13, 14 |
| 8 | 15, 16 |
| 9 | 17, 18 |
| 10 | 19, 20 |
| 11 | 21, 22 |
| 12 | 23, 24 |
| 13 | 25, 26 |
| 14 | 27, 28 |

| Segment | Sender | Receiver |
|---|---|---|
| External | Telekom | C.K., T.S., L.M. |
| Board | T.S. | A.H. |
| L1 | A.H. | K.L. |
| L2 | K.L. | U.R. |
| L3 | U.R. | J.F., M.V., C.L. |
| L4 | M.V. | A.H., A.M., A.N., A.P., K.M. |

| id | type | Parent id | Unique id | Currency | Value | segment | object |
|---|---|---|---|---|---|---|---|
| 1 | S | | | EUR | -3,000.00 | EXTERNAL | TELEKOM |
| 2 | R | | | EUR | 3,000.00 | EXTERNAL | C.K. |
| 3 | S | | | EUR | -2,500.00 | EXTERNAL | TELEKOM |
| 4 | R | | | EUR | 2,500.00 | EXTERNAL | T.S. |
| 5 | S | | | EUR | -5,000.00 | EXTERNAL | TELEKOM |
| 6 | R | | | EUR | 5,000.00 | EXTERNAL | L.M. |
| 7 | S | | | EUR | -2,200.00 | BOARD | T.S. |
| 8 | R | | | EUR | 2,200.00 | BOARD | A.H. |
| 9 | S | | | EUR | -2,000.00 | L1 | A.H. |
| 10 | R | | | EUR | 2,000.00 | L1 | K.L. |
| 11 | S | | | EUR | -1,750.00 | L2 | K.L. |
| 12 | R | | | EUR | 1,750.00 | L2 | U.R. |
| 13 | S | | | EUR | -800.00 | L3 | U.R. |
| 14 | R | | | EUR | 800.00 | L3 | J.F. |
| 15 | S | | | EUR | -700.00 | L3 | U.R. |
| 16 | R | | | EUR | 700.00 | L3 | M.V. |
| 17 | S | | | EUR | -100.00 | L3 | U.R. |
| 18 | R | | | EUR | 100.00 | L3 | C.L. |
| 19 | S | | | EUR | -200.00 | L4 | M.V. |
| 20 | R | | | EUR | 200.00 | L4 | A.M |
| 21 | S | | | EUR | -50.00 | L4 | M.V. |
| 22 | R | | | EUR | 50.00 | L4 | A.N. |
| 23 | S | | | EUR | -70.00 | L4 | M.V. |
| 24 | R | | | EUR | 70.00 | L4 | A.P. |
| 25 | S | | | EUR | -150.00 | L4 | M.V. |
| 26 | R | | | EUR | 150.00 | L4 | K.M. |
| 27 | S | | | EUR | -20.00 | L4 | M.V. |
| 28 | R | | | EUR | 20.00 | L4 | A.H. |
| 29 | S | | | EUR | -20.00 | L1 | A.H. |

| id | type | Parent id | Unique id | Currency | Value | Segment | Object |
|---|---|---|---|---|---|---|---|
| 1 | S | 0 | 1 | EUR | -3,000.00 | EXTERNAL | TELEKOM |
| 2 | R | 1 | 2 | EUR | 3,000.00 | EXTERNAL | C.K. |
| 3 | S | 0 | 3 | EUR | -2,500.00 | EXTERNAL | TELEKOM |
| 4 | R | 3 | 4 | EUR | 2,500.00 | EXTERNAL | T.S. |
| 5 | S | 0 | 5 | EUR | -5,000.00 | EXTERNAL | TELEKOM |
| 6 | R | 5 | 6 | EUR | 5,000.00 | EXTERNAL | L.M. |
| 7 | S | 4 | 7 | EUR | -2,200.00 | BOARD | T.S. |
| 8 | R | 7 | 8 | EUR | 2,200.00 | BOARD | A.H. |
| 9 | S | 8 | 9 | EUR | -2,000.00 | L1 | A.H. |
| 10 | R | 9 | 10 | EUR | 2,000.00 | L1 | K.L. |
| 11 | S | 10 | 11 | EUR | -1,750.00 | L2 | K.L. |
| 12 | R | 11 | 12 | EUR | 1,750.00 | L2 | U.R. |
| 13 | S | 12 | 13 | EUR | -800.00 | L3 | U.R. |
| 14 | R | 13 | 14 | EUR | 800.00 | L3 | J.F. |
| 15 | S | 12 | 15 | EUR | -700.00 | L3 | U.R. |
| 16 | R | 15 | 16 | EUR | 700.00 | L3 | M.V. |
| 17 | S | 12 | 17 | EUR | -100.00 | L3 | U.R. |
| 18 | R | 17 | 18 | EUR | 100.00 | L3 | C.L. |
| 19 | S | 16 | 19 | EUR | -200.00 | L4 | M.V. |
| 20 | R | 19 | 20 | EUR | 200.00 | L4 | A.M. |
| 21 | S | 16 | 21 | EUR | -50.00 | L4 | M.V. |
| 22 | R | 21 | 22 | EUR | 50.00 | L4 | A.N. |
| 23 | S | 16 | 23 | EUR | -70.00 | L4 | M.V. |
| 24 | R | 23 | 24 | EUR | 70.00 | L4 | A.P. |
| 25 | S | 16 | 25 | EUR | -150.00 | L4 | M.V. |
| 26 | R | 25 | 26 | EUR | 150.00 | L4 | K.M. |
| 27 | S | 16 | 27 | EUR | -20.00 | L4 | M.V. |
| 28 | R | 27 | 28 | EUR | 20.00 | L4 | A.H. |
| 29 | S | 28 | 9 | EUR | -20.00 | L1 | A.H. |

| node_id | type | Currency | segment | object | unique_id |
|---|---|---|---|---|---|
| 1 | S | EUR | EXTERNAL | TELEKOM | 1,3,5 |
| 2 | R | EUR | EXTERNAL | C.K. | 2 |
| 3 | R | EUR | EXTERNAL | T.S. | 4 |
| 4 | R | EUR | EXTERNAL | L.M. | 6 |
| 5 | S | EUR | BOARD | T.S. | 7 |
| 6 | R | EUR | BOARD | A.H. | 8 |
| 7 | S | EUR | L1 | A.H. | 9 |
| 8 | R | EUR | L1 | K.L. | 10 |
| 9 | S | EUR | L2 | K.L. | 11 |
| 10 | R | EUR | L2 | U.R. | 12 |
| 11 | S | EUR | L3 | U.R. | 13,15,17 |
| 12 | R | EUR | L3 | J.F. | 14 |
| 13 | R | EUR | L3 | M.V. | 16 |
| 14 | R | EUR | L3 | C.L. | 18 |
| 15 | S | EUR | L4 | M.V. | 19,21,23,25,27 |
| 16 | R | EUR | L4 | A.M | 20 |
| 17 | R | EUR | L4 | A.N. | 22 |
| 18 | R | EUR | L4 | A.P. | 24 |
| 19 | R | EUR | L4 | K.M. | 26 |
| 20 | R | EUR | L4 | A.H. | 28 |

| parent_node_id | node_id | parent_id | unique_id | currency |
|---|---|---|---|---|
| 1 | 2 | 1 | 2 | EUR |
| 1 | 3 | 3 | 4 | EUR |
| 1 | 4 | 5 | 6 | EUR |
| 3 | 5 | 4 | 7 | EUR |
| 5 | 6 | 7 | 8 | EUR |
| 6 | 7 | 8 | 9 | EUR |
| 7 | 8 | 9 | 10 | EUR |
| 8 | 9 | 10 | 11 | EUR |
| 9 | 10 | 11 | 12 | EUR |
| 10 | 11 | 12 | 13,15,17 | EUR |
| 11 | 12 | 13 | 14 | EUR |
| 11 | 13 | 15 | 16 | EUR |
| 11 | 14 | 17 | 18 | EUR |
| 13 | 15 | 16 | 19,21,23,25,27 | EUR |
| 15 | 16 | 19 | 20 | EUR |
| 15 | 17 | 21 | 22 | EUR |
| 15 | 18 | 23 | 24 | EUR |
| 15 | 19 | 25 | 26 | EUR |
| 15 | 20 | 27 | 28 | EUR |
| 20 | 7 | 28 | 9 | EUR |

FIG. 17

| parent_node_id | node_id | parent_id | unique_id | currency | Value |
|---|---|---|---|---|---|
| 1 | 2 | 1 | 2 | EUR | 3,000.00 |
| 1 | 3 | 3 | 4 | EUR | 2,500.00 |
| 1 | 4 | 5 | 6 | EUR | 5,000.00 |
| 3 | 5 | 4 | 7 | EUR | |
| 5 | 6 | 7 | 8 | EUR | 2,200.00 |
| 6 | 7 | 8 | 9 | EUR | |
| 7 | 8 | 9 | 10 | EUR | 2,000.00 |
| 8 | 9 | 10 | 11 | EUR | |
| 9 | 10 | 11 | 12 | EUR | 1,750.00 |
| 10 | 11 | 12 | 13,15,17 | EUR | |
| 11 | 12 | 13 | 14 | EUR | 800.00 |
| 11 | 13 | 15 | 16 | EUR | 700.00 |
| 11 | 14 | 17 | 18 | EUR | 100.00 |
| 13 | 15 | 16 | 19,21,23,25,27 | EUR | |
| 15 | 16 | 19 | 20 | EUR | 200.00 |
| 15 | 17 | 21 | 22 | EUR | 50.00 |
| 15 | 18 | 23 | 24 | EUR | 24.00 |
| 15 | 19 | 25 | 26 | EUR | 150.00 |
| 15 | 20 | 27 | 28 | EUR | 20.00 |
| 20 | 7 | 28 | 9 | EUR | |

| node_id | type | Value | Currency | segment | object | unique id |
|---|---|---|---|---|---|---|
| 1 | S | -10,500.00 | EUR | EXTERNAL | TELEKOM | 1,3,5 |
| 2 | R | 3,000.00 | EUR | EXTERNAL | C.K. | 2 |
| 3 | R | 2,500.00 | EUR | EXTERNAL | T.S. | 4 |
| 4 | R | 5,000.00 | EUR | EXTERNAL | L.M. | 6 |
| 5 | S | -2,200.00 | EUR | BOARD | T.S. | 7 |
| 6 | R | 2,200.00 | EUR | BOARD | A.H. | 8 |
| 7 | S | -2,000.00 | EUR | L1 | A.H. | 9 |
| 8 | R | 2,000.00 | EUR | L1 | K.L. | 10 |
| 9 | S | -1,750.00 | EUR | L2 | K.L. | 11 |
| 10 | R | 1,750.00 | EUR | L2 | U.R. | 12 |
| 11 | S | -1,600.00 | EUR | L3 | U.R. | 13,15,17 |
| 12 | R | 800.00 | EUR | L3 | J.F. | 14 |
| 13 | R | 700.00 | EUR | L3 | M.V. | 16 |
| 14 | R | 100.00 | EUR | L3 | C.L. | 18 |
| 15 | S | -490.00 | EUR | L4 | M.V. | 19,21,23,25,27 |
| 16 | R | 200.00 | EUR | L4 | A.M. | 20 |
| 17 | R | 50.00 | EUR | L4 | A.N. | 22 |
| 18 | R | 70.00 | EUR | L4 | A.P. | 24 |
| 19 | R | 150.00 | EUR | L4 | K.M. | 26 |
| 20 | R | 20.00 | EUR | L4 | A.H. | 28 |

| node_id | unique_id |
|---|---|
| 1 | 1,3,5 |
| 2 | 2 |
| 3 | 4 |
| 4 | 6 |
| 5 | 7 |
| 6 | 8 |
| 7 | 9 |
| 8 | 10 |
| 9 | 11 |
| 10 | 12 |
| 11 | 13,15,17 |
| 12 | 14 |
| 13 | 16 |
| 14 | 18 |
| 15 | 19,21,23,25,27 |
| 16 | 20 |
| 17 | 22 |
| 18 | 24 |
| 19 | 26 |
| 20 | 28 |

| parent_node_id | node_id | parent_id | unique_id | currency |
|---|---|---|---|---|
| 3 | 4 | 7 | 8 | EUR |
| 2 | 3 | 4 | 7 | EUR |
| 1 | 2 | 3 | 4 | EUR |

2410

| parent_node_id | node_id | parent_id | unique_id | currency |
|---|---|---|---|---|
| 3 | 4 | 7 | 8 | EUR |
| 2 | 3 | 4 | 7 | EUR |
| 1 | 2 | 3 | 4 | EUR |
| 4 | 5 | 8 | 9 | EUR |
| 5 | 6 | 9 | 10 | EUR |
| 6 | 7 | 10 | 11 | EUR |

Table 2510:

| parent_node_id | node_id | parent id | unique id | currency | Value |
|---|---|---|---|---|---|
| 3 | 4 | 7 | 8 | EUR | 2,200 |
| 2 | 3 | 4 | 7 | EUR | |
| 1 | 2 | 3 | 4 | EUR | 2,500 |
| 4 | 5 | 8 | 9 | EUR | |
| 5 | 6 | 9 | 10 | EUR | 2,000 |
| 6 | 7 | 10 | 11 | EUR | |

Table 2520:

| node_id | type | Value | Currency | segment | unique id |
|---|---|---|---|---|---|
| 1 | S | -2,500.00 | EUR | EXTERNAL | 3 |
| 2 | R | 2,500.00 | EUR | EXTERNAL | 4 |
| 3 | S | -2,200.00 | EUR | BOARD | 7 |
| 4 | R | 2,200.00 | EUR | BOARD | 8 |
| 5 | S | -2,000.00 | EUR | L1 | 9 |
| 6 | R | 2,000.00 | EUR | L1 | 10 |
| 7 | S | -1,750.00 | EUR | L2 | 11 |

Table 2530:

| node_id | unique id |
|---|---|
| 1 | 3 |
| 2 | 4 |
| 3 | 7 |
| 4 | 8 |
| 5 | 9 |
| 6 | 10 |
| 7 | 11 |

FIG. 25

| node_id | type | Currency | segment | unique_id |
|---|---|---|---|---|
| 1 | S | EUR | EXTERNAL | 1,3,5 |
| 2 | R | EUR | EXTERNAL | 2,4,6 |
| 3 | S | EUR | BOARD | 7 |
| 4 | R | EUR | BOARD | 8 |
| 5 | S | EUR | L1 | 9 |
| 6 | R | EUR | L1 | 10 |
| 7 | S | EUR | L2 | 11 |
| 8 | R | EUR | L2 | 12 |
| 9 | S | EUR | L3 | 13,15,17 |
| 10 | R | EUR | L3 | 14,16,18 |
| 11 | S | EUR | L4 | 19,21,23,25,27 |
| 12 | R | EUR | L4 | 20,22,24,26,28 |

2740

Segment: L2
Amount: -1,750 EUR

2710

2720

Viewable scope:
◄ - 3 + ↵

Viewable fields:
| Segment X ▼ |

2730

| parent node id | node id | parent id | unique id | currency |
|---|---|---|---|---|
| 6 | 7 | 10 | 11 | EUR |
| 5 | 6 | 9 | 10 | EUR |
| 4 | 5 | 8 | 9 | EUR |

← 2810

| parent node id | node id | parent id | unique id | currency |
|---|---|---|---|---|
| 6 | 7 | 10 | 11 | EUR |
| 5 | 6 | 9 | 10 | EUR |
| 4 | 5 | 8 | 9 | EUR |
| 7 | 8 | 11 | 12 | EUR |
| 8 | 9 | 12 | 13,15,17 | EUR |
| 9 | 10 | 13,15,17 | 14,16,18 | EUR |

| parent_node_id | node_id | parent id | unique id | currency | Value |
|---|---|---|---|---|---|
| 6 | 7 | 10 | 11 | EUR | 2,000 |
| 5 | 6 | 9 | 10 | EUR | |
| 4 | 5 | 8 | 9 | EUR | 1,750 |
| 7 | 8 | 11 | 12 | EUR | |
| 8 | 9 | 12 | 13,15,17 | EUR | 1,600 |
| 9 | 10 | 13,15,17 | 14,16,18 | EUR | |

2920

| node_id | type | Value | Currency | segment | unique id |
|---|---|---|---|---|---|
| 4 | R | 2,200.00 | EUR | BOARD | 8 |
| 5 | S | -2,000.00 | EUR | L1 | 9 |
| 6 | R | 2,000.00 | EUR | L1 | 10 |
| 7 | S | -1,750.00 | EUR | L2 | 11 |
| 8 | R | 1,750.00 | EUR | L2 | 12 |
| 9 | S | -1,600.00 | EUR | L3 | 13,15,17 |
| 10 | R | 1,600.00 | EUR | L3 | 14,16,18 |

2930

| node_id | unique id |
|---|---|
| 4 | 8 |
| 5 | 9 |
| 6 | 10 |
| 7 | 11 |
| 8 | 12 |
| 9 | 13,15,17 |
| 10 | 14,16,18 |

FIG. 29

| parent_node_id | node_id | parent_id | unique_id | currency |
|---|---|---|---|---|
| 7 | 8 | 9 | 10 | EUR |
| 6 | 7 | 8 | 9 | EUR |
| 5 | 6 | 7 | 8 | EUR |

↗ 3210

| parent_node_id | node_id | parent_id | unique_id | currency |
|---|---|---|---|---|
| 7 | 8 | 9 | 10 | EUR |
| 6 | 7 | 8 | 9 | EUR |
| 5 | 6 | 7 | 8 | EUR |
| 8 | 9 | 10 | 11 | EUR |
| 9 | 10 | 11 | 12 | EUR |
| 10 | 11 | 12 | 13, 15, 17 | EUR |

| parent_node_id | node_id | parent_id | unique_id | currency | Value |
|---|---|---|---|---|---|
| 7 | 8 | 9 | 10 | EUR | 2,000 |
| 6 | 7 | 8 | 9 | EUR | |
| 5 | 6 | 7 | 8 | EUR | 2,200 |
| 8 | 9 | 10 | 11 | EUR | |
| 9 | 10 | 11 | 12 | EUR | 1,750 |
| 10 | 11 | 12 | 13,15,17 | EUR | |
 3310
| node_id | type | Value | Currency | segment | unique_id |
|---|---|---|---|---|---|
| 5 | S | -2,200.00 | EUR | T.S. | 7 |
| 6 | R | 2,200.00 | EUR | A.H. | 8,28 |
| 7 | S | -2,000.00 | EUR | A.H. | 9 |
| 8 | R | 2,000.00 | EUR | K.L. | 10 |
| 9 | S | -1,750.00 | EUR | K.L. | 11 |
| 10 | R | 1,750.00 | EUR | U.R. | 12 |
| 11 | S | -1,600.00 | EUR | U.R. | 13,15,17 |
 3320
| node_id | unique_id |
|---|---|
| 5 | 7 |
| 6 | 8,28 |
| 7 | 9 |
| 8 | 10 |
| 9 | 11 |
| 10 | 12 |
| 11 | 13,15,17 |
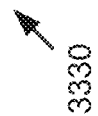 3330
FIG. 33

FAST TABLE SEARCH FOR VISUALIZATION OF COMPLEX HIERARCHY DATA

CROSS-REFERENCE TO RELATED APPLICATIONS

The present application is a continuation-in-part of U.S. patent application Ser. No. 17/545,727, filed Dec. 8, 2021, and claims the benefit of U.S. Provisional Application No. 63/312,342, filed Feb. 21, 2022, all of which are incorporated by reference herein.

BACKGROUND

Tracing value distributions among many entities and/or objects organized in a complex hierarchical structure can be technically challenging. One example of value distribution is the distribution of values (e.g., expenses, costs, etc.) among entities (e.g., persons, departments, cost centers, etc.) in an organization that participated in or contributed to the specific values. These values can be distributed based on definitions commonly defined by a controlling department of the organization, and such definitions can be specified in allocations (also referred to as "cycles" hereinafter). Cycle definitions can be very complex, possibly containing millions of individual value distributions. Additionally, depending on the cycle definition, the value distributions may not be a linear flow but instead contain recursive and/or iterative value distributions. Thus, analyzing value distributions can be time consuming and easy to get lost in the complexity. Accordingly, there remains a need for an improved system and method for efficiently visualizing value distributions in complex cycle definitions.

BRIEF DESCRIPTION OF THE DRAWINGS

FIG. 4 depicts an example line-item table containing data underlying the cycle definition of FIG. 2.

FIG. 11 depicts example hash tables generated from the line-item table of FIG. 4.

FIG. 13 depicts an initial hierarch table created from the line-item table of FIG. 4.

FIG. 14 is an updated hierarch table created from the line-item table of FIG. 4.

FIG. 16 depicts an initial data table of a node-link model created from the hierarchy table of FIG. 14.

FIG. 17 depicts a data table of the node-link model generated from the one depicted in FIG. 16.

FIG. 18 depicts a data table of the node-link model generated from the one depicted in FIG. 17.

FIG. 19 depicts a data table of the node-link model generated from the one depicted in FIG. 18.

FIG. 20 depicts a lookup table generated based on the data table of the node-link model depicted in FIG. 19.

FIG. 24 depicts two data tables representing nodes and links recursively created from the user defined focus node, according to the first use case.

FIG. 25 depicts additional data tables generated, according to the first use case.

FIG. 28 depicts two data tables representing nodes and links recursively created from the user defined focus node, according to the second use case.

FIG. 29 depicts additional data tables generated, according to the second use case.

FIG. 32 depicts two data tables representing nodes and links recursively created from the user defined focus node, according to the third use case.

FIG. 33 depicts additional data tables generated, according to the third use case.

DETAILED DESCRIPTION

Figure 1:
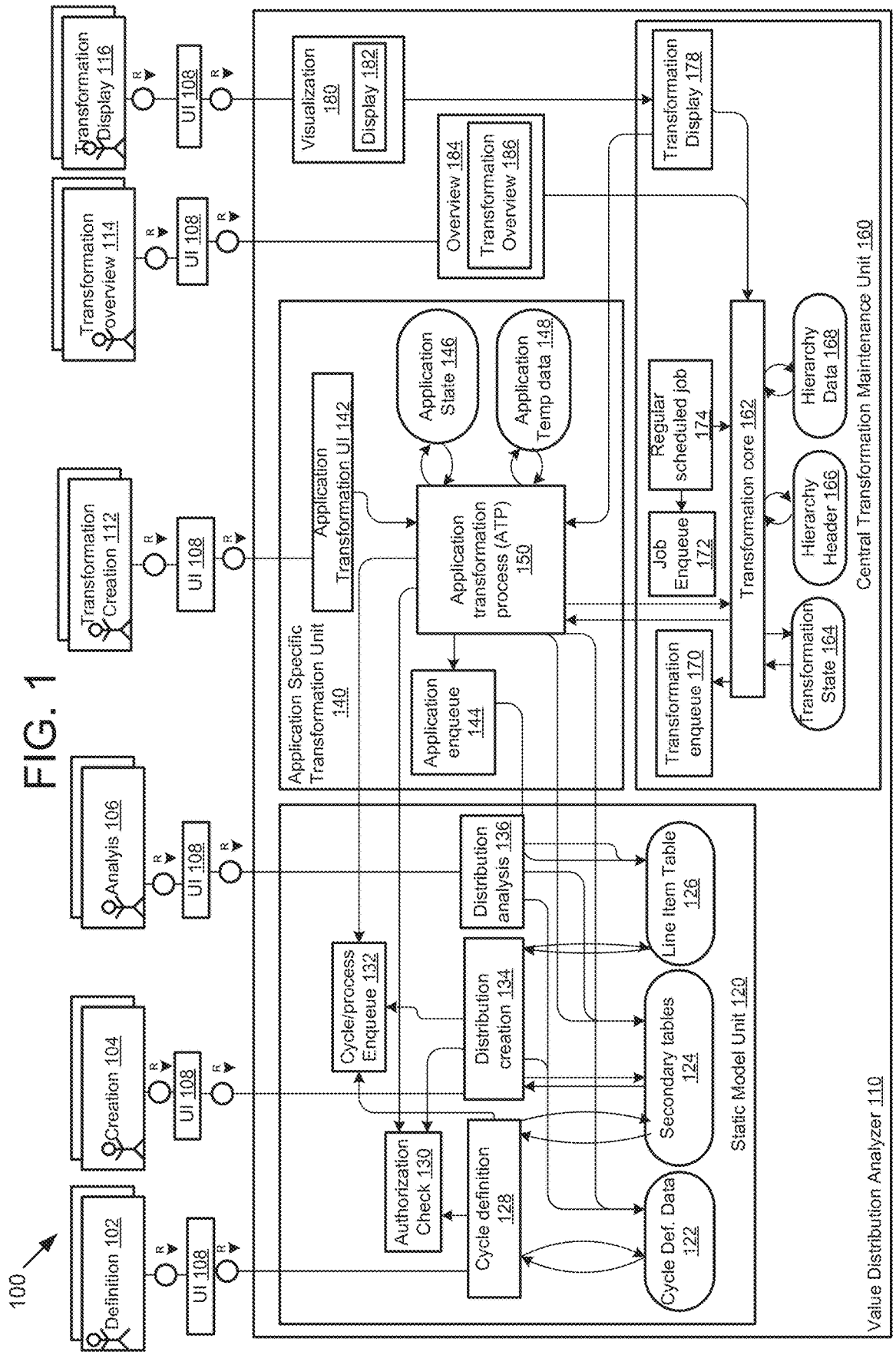
FIG. 1 is an overall block diagram of an example computing system configured to support visualization of complex hierarchy data with interactive adjustments.

Example 1—Overview of Value Distributions According to Cycle Definitions

Tracing value distributions among many entities and/or objects organized in a complex hierarchical structure can be technically challenging. For examples, values (e.g., expenses, costs, etc.) can be distributed among many entities (e.g., cost centers, etc.) in an organization that participated in or contributed to the specific values. These values can be distributed based on definitions defined by a controlling department of the organization in the form of cycle definition, such as FI cycles defined in SAP FICO from SAP SE, of Walldorf, Germany.

Cycle definitions can specify that, e.g., for "mobile cellphone usage," values are distributed to multiple cost centers on a percentual level (e.g., every cost center covers 10% of the values in case there are 10 affected cost centers). Cycle definitions can also specify that a fixed value has to be distributed to specific cost centers while the remaining values are distributed to the remaining cost centers. Such distributions can create a value flow wherein cost centers distribute their values to other cost centers based on a different definition. The resulting value flow according to a cycle definition can be very complex, possibly containing millions of individual value distributions. Additionally, depending on the cycle definition, the value distributions may not be a linear flow but instead contain recursive and/or iterative value distributions.

Conventionally, the complexity of a cycle's value flow poses problems for organizations which would require extensive manpower to work around. For example, it can be difficult to understand and/or trace how an expense is distributed to numerous cost centers according to a specific cycle definition. Without such understanding or traceability, mistakes and/or errors within the cycle definition cannot be found and fixed. Such traceability is also important for compliance auditing purposes, allowing an auditor to follow a value flow from a specific cost center back to its origin and/or follow its distribution path down to the end.

Most existing solutions for analyzing the value distributions focus on excerpts of the value flow, thus not offering a whole-picture view to answer the question: where the expenses of a cost center originate from and who paid, not just an excerpt but as a full end-to-end distribution for the cost center in a specified time frame. Although it is possible to investigate a cycle and display the value flow between a receiver (also referred to as "debtor") and a sender (also referred to as "creditor"), it typically requires additional manual steps to check the value flow from that sender (acting as a receiver in another value distribution) onwards. The task becomes even more challenging when the cycle definition involves recursive and/or iterative value distributions. As a result, such "excerpt" view of value flow limits the ability of analyzing the value distributions.

The technologies described herein allows visualization of complex value distributions in cycle definitions and the visual display can be interactively and dynamically adjusted by a user. Specifically, the user can interactively adjust the visual display of the value distributions in a graphical user interface (UI) to control the amount of data and UI elements presented, allowing the user to understand and digest information in a scalable manner without being overwhelmed. As a result, the user not only can have a holistic view of the overall value distributions in the cycle, but also can freely navigate and set focus on particular value distributions within the cycle. Furthermore, the technologies described herein can be used to analyze any types of value distributions (i.e., not limited to cost/expense distributions) among entities and/or objects organized in a hierarchical structure, and can be applied across a wide variety of enterprise software environments.

Example 2—Example Overview of Computing System for Analyzing Hierarchical Value Distributions FIG. 1 shows an overall block diagram of an example computing system 100 configured to support visualization and analysis of complex data organized in a hierarchical structure with interactive adjustments.

The computing system 100 includes a value distribution analyzer 110, which can be accessed by a plurality of users (e.g., 102, 104, 106, 112, 114, 116, etc.) having different roles via a user interface 108 (e.g., SAPUI5, etc.). As shown, the value distribution analyzer 110 can include a static model unit 120, an application specific transformation unit 140, a central transformation maintenance unit 160, an overview unit 184, and a visualization unit 180.

Through a cycle definition UI 108, a user 102 can access a cycle definition module 128 within the static model unit 120 to create and/or change cycle definitions (e.g., using predefined transaction codes). As described further below, value distributions can be defined in cycles including segments which contain one or more objects and/or entities (e.g., cost centers, etc.) and specifying manner of value distributions (e.g., by factors/percentages, specific values, etc.).

The static model unit 120 can include an authorization check unit 130 configured to ensure that only users with required authorizations may access the cycle definition UI 108 (and the cycle definition module 128), as well as a cycle/process enqueue unit 132 configured to ensure that only one user may create or change a specific cycle definition at a time.

The cycle definitions can be stored in a database table 122 (which may change over time). In certain cases, the starting point of the cycle (e.g., the first segment of the cycle) can be determined from the cycle definitions stored in the database table 122. In certain circumstances, multiple secondary database tables 124 which may contain meta data for controlling segments and/or other customization purposes. Cycles and the related documents may be stored with versioning.

A user 104 can post a value transaction document to a distribution creating engine 134 of the static model unit 120, which is configured to create value distributions between objects and/or entities affected by the transaction based on corresponding cycle definition contained in the cycle definition module 128. In certain cases, the enqueue unit 132 can be configured to prevent a duplicate execution when creating the value distributions. The resulting value distributions corresponding to the cycle definition represent a cycle, which can be stored in one or more line-item tables 126 (and optionally in secondary database tables 124). As more value distributions are added to a cycle, more entries (e.g., data rows) can be added to the line-item tables 126. As described herein, such line-item tables 126 embody a static cycle model according to the cycle definition.

In certain examples, a user 106 can use a distribution analysis engine 136 of the static model unit 120 to analyze a specific cycle or display data related to a specific object in different cycles based on data stored in 122, 126, and/or 124. The analysis performed by the distribution analysis engine 136 can be preliminary. For example, it may be possible to see to what values an object (as a sender) distributes to other objects (as receivers) in a 1:n relationship, and one can then follow the value distributions to check the next object.

However, within a bigger cycle containing thousands or even millions of value distributions, relying on the distribution analysis engine 136 to get an overview and/or to understand/trace a specific value flow between objects may be too complicated and time consuming Instead, the static cycle model can be transformed into a dynamic cycle model for more efficient visualization and analysis, as described further below.

For example, a user 108 can specify one or more cycles to be transformed via an application transformation UI 142 of the application specific transformation unit 140. This can cause an Application Transformation Process (ATP) 150 in the application specific transformation unit 140 to perform some preliminary evaluation (e.g., "does the specified cycle already exist?") by checking the cycle definition data 122 and/or the line-item tables 126. When that check passes (i.e., no such cycle exists), the ATP 150 can call the central transformation maintenance unit 160 and request initiating a transformation task by providing 162 a callback handle so that when the transmission core 162 calls back, the ATP 150 can provide necessary data to the transmission core 162 for processing. The provided data can be stored in a memory space 164 and the request can be stored in another memory space 166.

, As described herein, the ATP 150 in the application specific transformation unit 140 can run asynchronously from the central transformation maintenance unit 160. The ATP 150 can contain, among others, software code to initiate and monitor the process of creating a hierarchy table from the line-item tables stored in 126 (which is described further below).

Activation of the ATP 150 (and before its completion) can effectuate a lock in an application enqueue 144 to prevent parallel activation of the ATP 150 for the same cycle. When the ATP 150 is activated, its application state can be tracked in a memory space 146, and any temporary data generated can be stored in another memory space 148.

The central transformation maintenance unit 160 can interact synchronously with the application specific transformation unit 140 to exchange information. For example, activation of the ATP 150 can immediately trigger the transformation core 162 to start a transformation process to transform a static cycle model into a corresponding dynamic cycle model. A transformation enqueue 170 can be configured to prevent parallel execution of the transformation process.

On the other hand, the central transformation maintenance unit 160 can run asynchronously from the application specific transformation unit 140. For example, once triggered by the ATP 150 to transform a static cycle model, the transformation core 162 can divide the transformation process into a plurality of regularly scheduled jobs 174 organized in a queue (e.g., to be executed every 10 minutes, etc.) and coordinate execution of the jobs. Execution of a job can effectuate a lock for itself via a job enqueue 172 to prevent parallel execution of the job.

More specifically, by checking the memory space 164, the central transformation maintenance unit 162 can determine there is a pending task requested from ATP 150. The central transformation maintenance unit 162 can retrieve data from the memory space 164, and use the callback to call 150 with the data retrieved from 164. The ATP 150 can set a lock at the application enqueue 144, recording its application status in 146 (to indicate it is processing) and informing the central transformation maintenance unit 162 that it is starting the transformation process.

In certain examples, the ATP 150 can regularly update the application status 146 with a running timestamp. When the regularly scheduled job 174 runs, the central transformation maintenance unit 162 can call ATP 150 (e.g., again using 164) and inquire its application state, and the ATP 150 can return its current state and the timestamp stored in the 146. The central transformation maintenance unit 162 can check if the timestamp is within a predefined range. If the lag has been too long that exceeds a predefined duration limit, e.g., an hour has elapsed since the last timestamp was set, then the central transformation maintenance unit 162 can assume that the process in ATP 150 has terminated and can generate an error.

The ATP 150 can continue to execute and store a ready status in 146 with a current timestamp after it has created the required data in 148. If the central transformation maintenance unit 162 receives notification that the ATP 150 states that the results are ready, the central transformation maintenance unit 162 can then query the ATP 150 for the resulting hierarchy data, which can be retrieved by the ATP 150 from 148. The central transformation maintenance unit 162 can then use such to and create the hierarchy data in 166 and 168 and update 164, and also notify the ATP 150 so that it can delete its data (and such deletion can be performed by the ATP 150 in an asynchronous manner).

The transformation core 162 can keep track of the various status information of the transformation process in a dedicated memory space 164. After the transformation process is successfully completed, the dynamic cycle model can be persisted in one or more hierarchy tables and stored in a memory space 168. In certain examples, certain meta data of the dynamic cycle model such as hierarchy table header information can be stored in another memory space 166.

In certain examples, a user 114 can view the list of all available transformation processes and their specific states via a transformation overview interface 186 contained in the overview unit 184, which interacts with the transformation core 162. In the depicted example, the overview unit 184 is outside (and independent of) the central transformation maintenance unit 160. Alternatively, the overview unit 184 can be included in the central transformation maintenance unit 160.

Further, a transformation display unit 178 can create a node-link model from the hierarchy table(s), the process of which is described further below. Based on input from a user 116, visual representation of the node-link model or a portion of it can be interactively generated by the visualization unit 180 and rendered on a graphical UI 182. Example method of interactively generating such visual representation of node-link model is described more fully below. In the depicted example, the transformation display unit 178 is embedded inside the central transformation maintenance unit 160. Alternatively, the transformation display unit 178 can be outside (and independent of) the central transformation maintenance unit 160.

In practice, the systems shown herein, such as system 100, can vary in complexity, with additional functionality, more complex components, and the like. For example, there can be additional functionality within the value distribution analyzer 110. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the line-item table, the hierarchy table, the node link model, the value distributions, the objects and/or segments in a cycle, and the like can be stored in one or more computer-readable storage media or computer-readable storage devices. The technologies described herein can be generic to the specifics of operating systems or hardware and can be applied in any variety of environments to take advantage of the described features.

Example 3—Example Cycle Definition

In any of the examples herein, a cycle defines how values (e.g., expenses, costs, etc.) are distributed among different entities and/or objects (e.g., cost centers) at different levels (also referred to as segments) within an organization. For example, the values can be passed down through an organization's cost center hierarchy, starting at board level down to the lowest level of managers. Cost distributions between these segments and/or cost centers can be defined by fixed value, fixed percentage, variable, etc.

Figure 2:
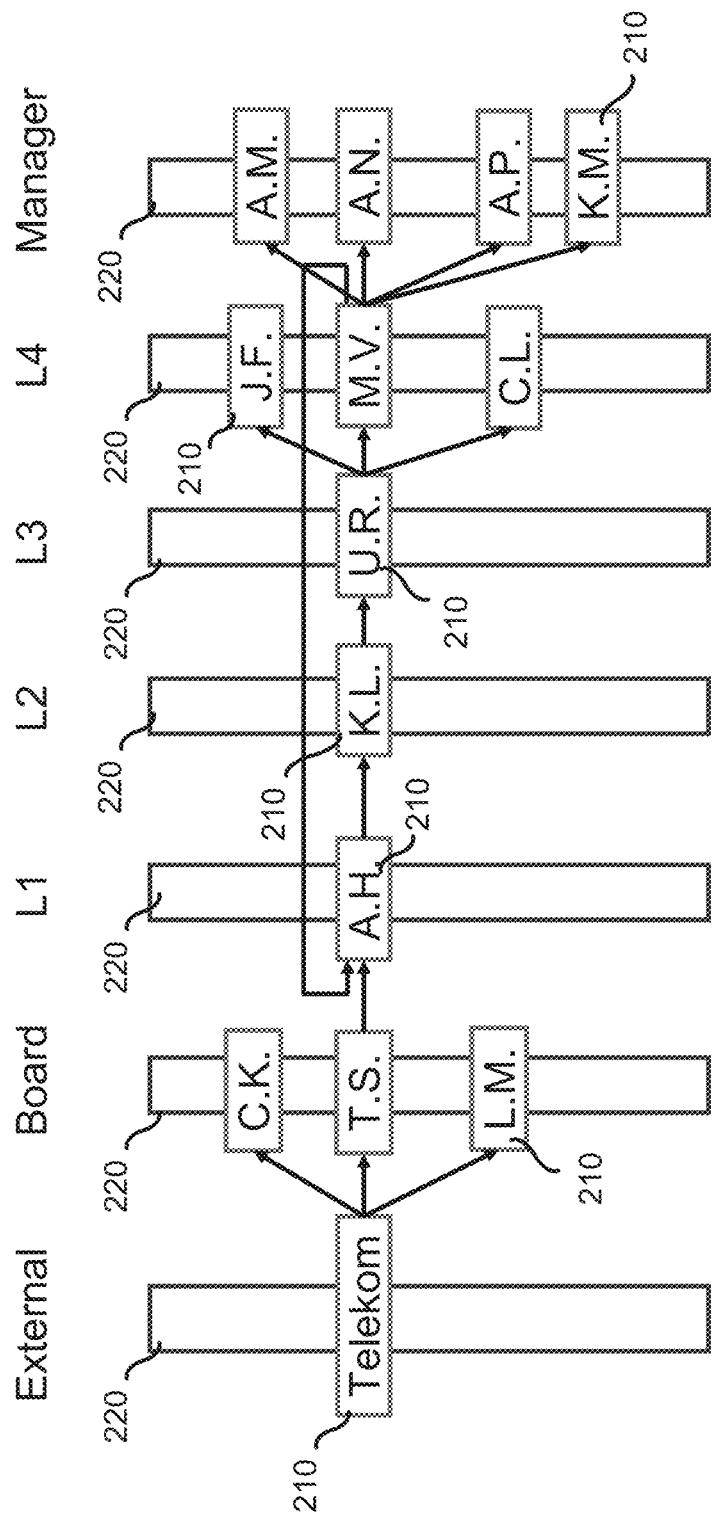
FIG. 2 is an example cycle definition of value distributions between objects organized in multiple segments.

An example cycle definition 200 is depicted in FIG. 2, which shows value distributions between a plurality of entities 210 organized in a plurality of segments 220 representing various levels, e.g., External, Board, L1, L2, L3, L4, and Manager. In the depicted example, the External segment represents a starting point of the cycle (i.e., the original source of all value distributions in the cycle), and the other segments represent different hierarchy levels in an organization where the value distributions occur.

As shown in this specific example, a value posted by entity Telekom (in External segment) can be distributed to three entities (C.K., T.S., and L.M.) in the Board segment. The value received by T.S. can be distributed to entity A.H. in the L1 segment. The value received by A.H. can be distributed to entity K.L. in the L2 segment. The value received by K.L. can be distributed to entity U.R. in the L3 segment. The value received by U.R. can be distributed to three entities (J.F., M.V., and C.L.) in the L4 segment. The value received by M.V. can be distributed to four entities (A.M., A.N., A.P., and K.M.) in the L4 segment as well as back to A.H. in the L1 segment.

As shown, an entity that is a receiver of a value distribution can be a sender of another value distribution, or vice versa. For example, T.S. is the receiver of the value distribution sent from Telekom, and is also a sender of the value distribution that is received by A.H. In addition, the value distributions can be recursive. For example, the value distribution from M.V. to A.H. makes the cycle definition 200 recursive because M.V., which receives its value distribution indirectly from A.H. (through the intermediaries K.L. and U.R.), sends a portion of its value distribution back to A.H. When creating value distributions based on the cycle definition 200, the recursions are executed until all the open values still to be distributed are reduced to zero.

Figure 3:
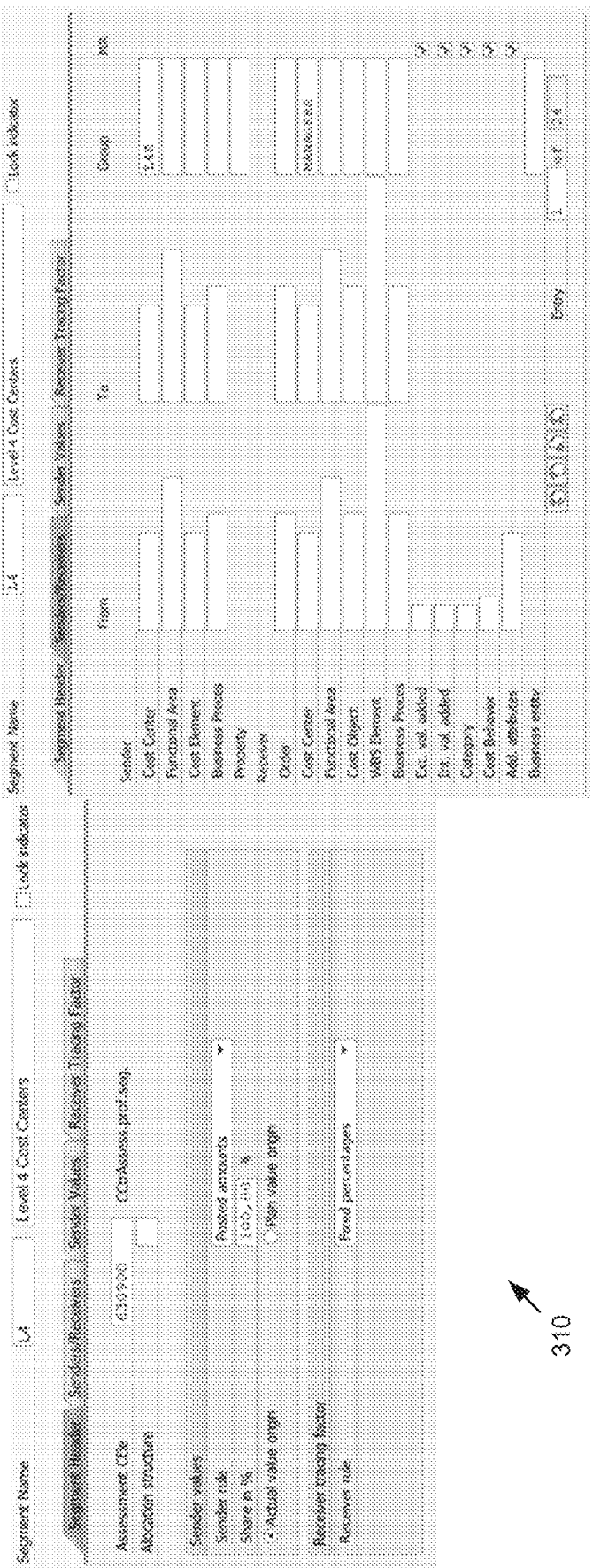
FIG. 3 depicts example user interfaces that can be used to define a cycle.

In certain examples, the cycle definition 200 can be created by a user (e.g., 102) through a cycle definition UI (e.g., 108). Two example excerpts of the cycle definition UI are depicted in FIG. 3. As shown, the cycle definition UI can include a dialog box (e.g., 310, 320) which allows a user to define the name of each segment (e.g., "L4") and an associated description (e.g., "Level 4 Cost Centers"). As the dialog box 320 indicates, the senders and receivers of a value distribution can be defined either directly as a range between "From" and "To" or by a reference to a group containing list of entities (e.g., cost centers). For example, the sender Group "L4S" can be used which may include the cost centers J.F., M.V., and C.L., and the receiver group "MANAGERS" may comprise the cost centers A.M., A.N., A.P. and K.M.

Example 4—Example Line-Item Table

As noted above, the created value distributions of a cycle can be stored in one or more line-item tables (e.g., 126). An example line-item table 400 containing data underlying the cycle definition 200 is shown in FIG. 4. In certain cases, a cycle can be defined in multiple line-item tables (e.g., the cycle may include millions of value distributions but the line-item tables have a limit on the maximum number of rows allowed per table). It is to be understood that the line-item table 400 can include many more fields (shown as columns), and only selected fields are depicted in FIG. 4.

As depicted, the line-item table 400 can include a plurality of rows of data depicting values distributions between senders (also referred to as creditors, or denoted as "C") and receivers (also referred to as debtors, or denoted as "D"). Each row shows one sender and one receiver. The receivers can have negative or positive total distributed values (listed in the last column), and the associated senders have the same total values but negated (i.e., negative value becomes positive, positive value becomes negative). The negative sign indicates value decrease from a sender's perspective while the positive sign indicates value increase from a receiver's perspective. For example, the first two rows indicate that a total value of 100,000 is distributed from Telekom (sender) to T.S. (receiver).

As shown, each value distribution between a pair of entities can be represented by two rows (e.g., to be compliant with relevant accounting rules). For example, in rows 1 and 2, the External/Telekom=>Board/T.S. distribution is stored there along with the calculated total distributed values. Also note that in row 2, the sender "Telekom" (Object number) and the receiver "T.S." (Partner Object) from row 1 are swapped and the total distributed value becomes positive. This behavior is repeated for every entry of value distribution.

In addition, in the line-item table 400, a single entity can be represented by two objects residing in two different segments. For example, the entity T.S. can be represented by two T.S. objects respectively located in the External and Board segments (see, e.g., rows 2 and 3), the entity A.H. can be represented by two A.H. objects respectively located in the Board and L1 segments (see, e.g., rows 4 and 5), and so on. The separation of one entity into two objects located in two different segments reflects different roles the entity acts (e.g., as a sender or receiver) in value distributions. For example, the T.S. object in the External segment represents the T.S. entity acting as a receiver of a value distributed from Telekom, whereas the T.S. object in the Board segment represents the T.S. entity acting as a sender of a value distributed to A.H.

Note that in the depicted example, the line-item table 400 has no indicator where the starting point of the cycle definition is (e.g., to indicate the External segment is the beginning of value distribution). In addition, the line-item table 400 has no indicator the existence of recursive or iterative value flows in the cycle definition.

Figure 5:
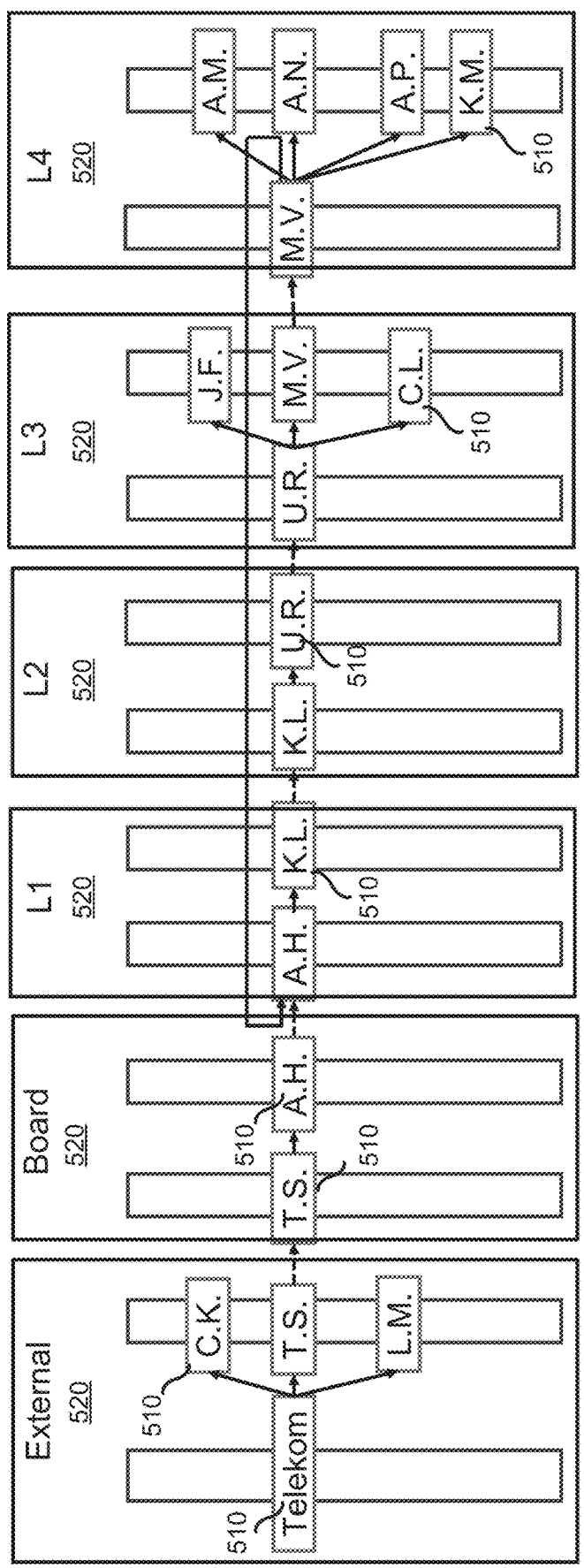
FIG. 5 is another representation of the cycle definition based on the line-item table of FIG. 4.

FIG. 5 depicts another representation of the cycle definition 500 based on the same line-item table 400. Unlike 200 which depicts entities 210 in different segments, the cycle definition 500 depicts a plurality of objects 510 organized in different segments 520. In other words, the cycle definition 500 is more consistent with row data stored in the line-item table 400 by separating one entity into two objects located in two different segments if the entity acts as both a sender and a receiver. For example, the T.S. object acts as a sender in the Board segment, but acts as a receiver in the External segment.

In FIG. 5, the actual sender-to-receiver value distributions (i.e., the value distribution from one entity to another entity) are represented by solid arrows connecting pairs of objects (e.g., T.S. to A.H., A.H. to K.L., M.V. to A.H. etc.), whereas the dashed arrows between objects represent role change of corresponding entities (e.g., a receiver becomes a sender).

Because the cycle definition 500 depicted in FIG. 5 more closely reflects the data structure of the line-item table 400, such format of graphical representation (i.e., splitting one entity into two role-specific objects) is used below to illustrate examples of visualizing complex value distributions in cycle definitions according to the technology described herein. Nonetheless, in certain circumstances, the cycle definition 200 depicted in FIG. 2 may also be presented in a graphical format based on the same principles described herein.

Figure 6:
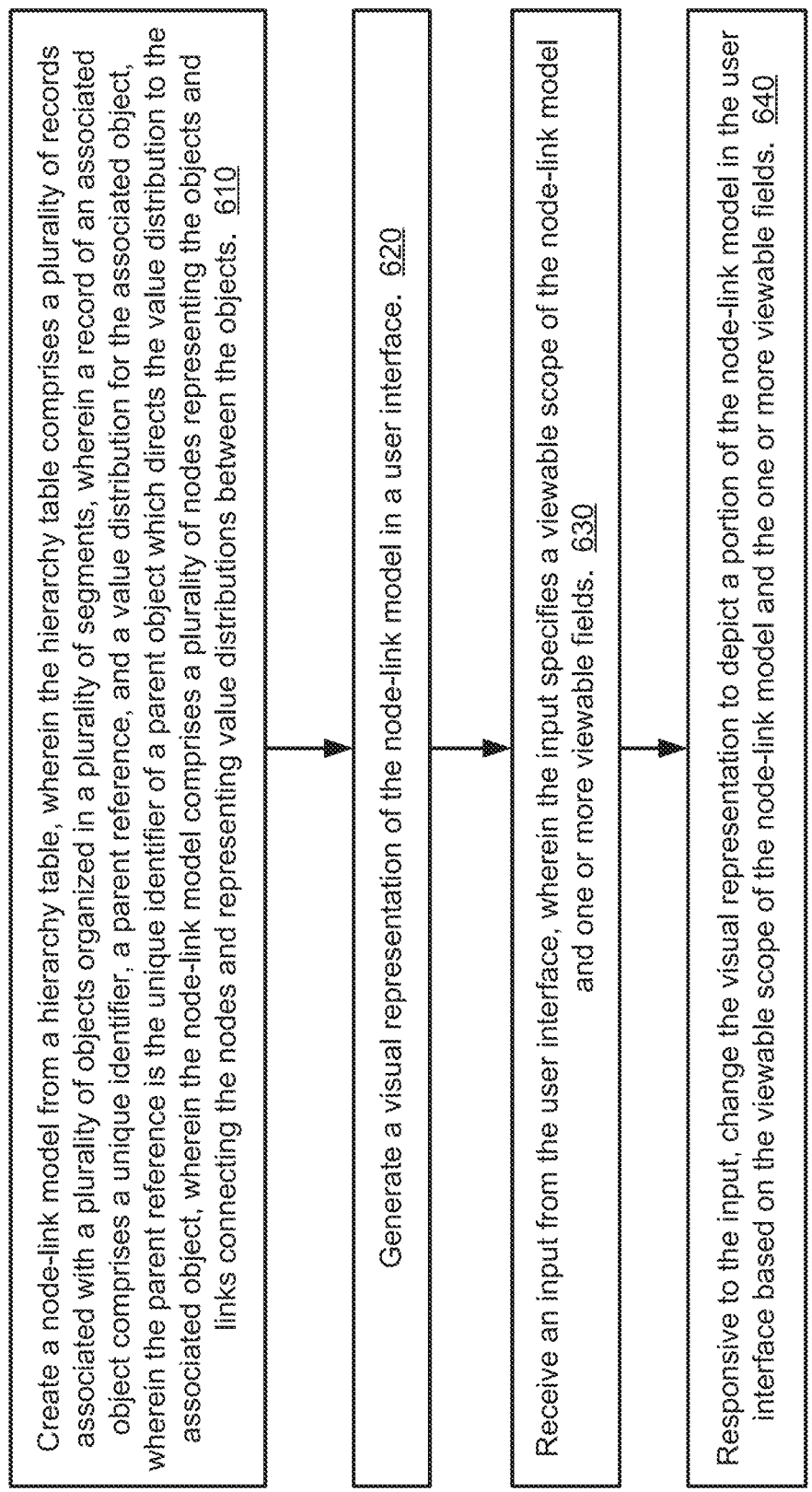
FIG. 6 is a flowchart illustrating an example overall method of visualizing value distributions in a cycle definition.

Example 5—Example Overall Method of Visualizing Value Distributions in Cycle Definitions FIG. 6 is a flowchart of an example overall method 600 of implementing visualization of complex value distributions in cycle definitions, and can be performed, for example, by the system of FIG. 1.

At 610, the method 600 can create a node-link model (e.g., via the transformation display 178) from a hierarchy table (e.g., stored in 168). As described more fully below, the hierarchy table can be transformed from a line-item table (e.g., 400) which contains a plurality of rows of data underlying a selected cycle definition.

As described further below, the hierarchy table can comprise a plurality of records associated with a plurality of objects organized in a plurality of segments. A record of an associated object can include a unique identifier, a parent reference, and a value distribution for the associated object. The parent reference is the unique identifier of a parent object which directs the value distribution to the associated object.

Also as described further below, the node-link model can include a plurality of nodes representing the objects and links connecting the nodes and representing value distributions between the objects.

At 620, the method 600 can generate a visual representation of the node-link model in a user interface (e.g., on the display 182).

At 630, the method 600 can receive an input from the user interface. The input can specify a viewable scope of the node-link model and one or more viewable fields.

At 640, responsive to the input, the method 600 can change the visual representation to depict a portion of the node-link model in the user interface based on the viewable scope of the node-link model and the one or more viewable fields.

The method 600 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Figure 7:
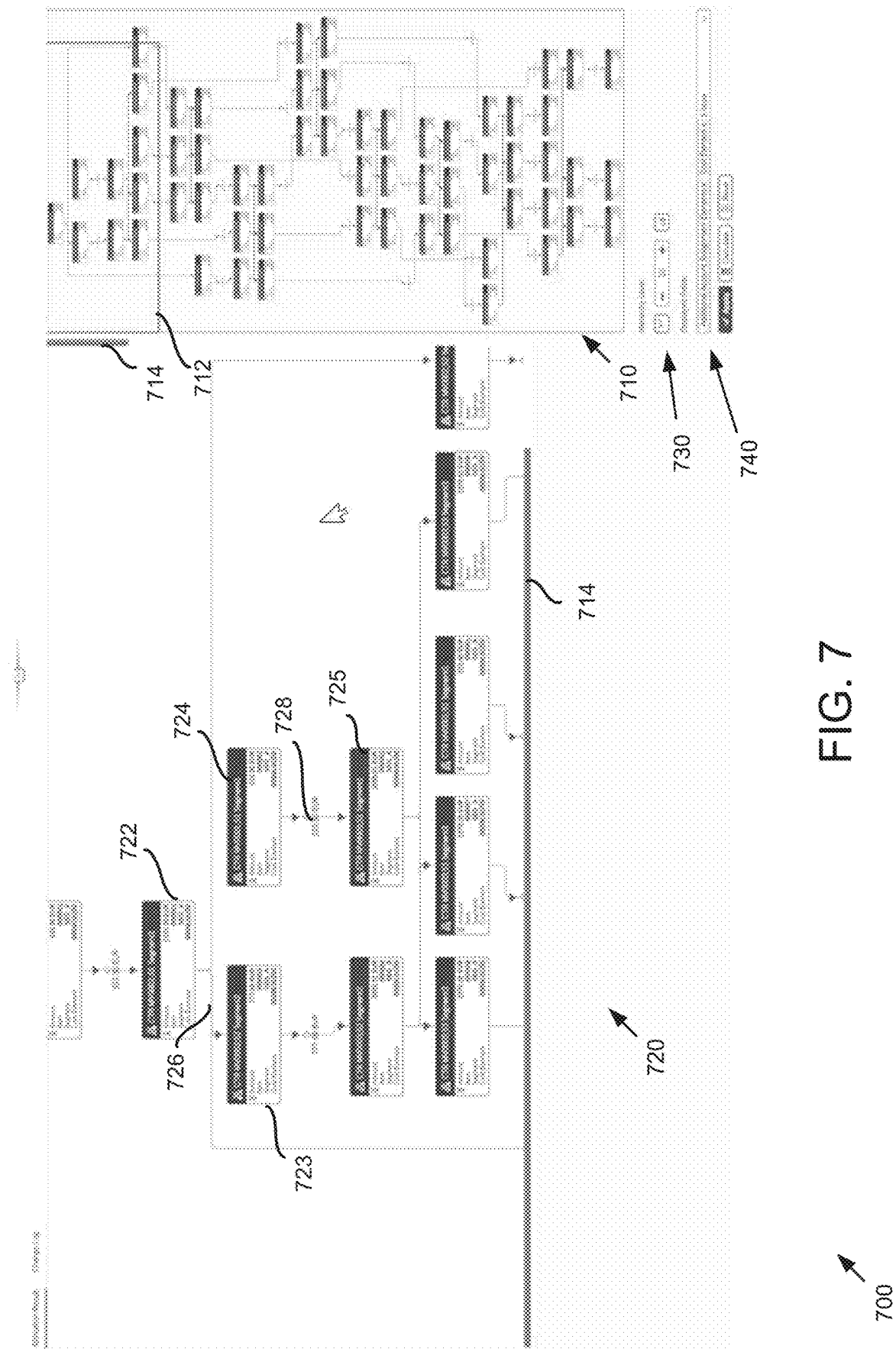
FIG. 7 is an example graphical user interface where a user can interactively adjust the visual display of value distributions in a cycle definition.

Example 6—Example User Interface Supporting Interactive Visualization of Value Distributions in Cycle Definitions FIG. 7 depicts an example snapshot of a graphical user interface (GUI) 700 where a user can interactively adjust the visual display of value distributions in a cycle definition. It is to be understood that specific arrangements of windows and displayed items in 700 are merely exemplary, and different arrangements or configurations can be implemented following the principles described herein.

In the depicted example, the GUI 700 includes an overview window 710, a detail view window 720, a viewable scope definition area 730, and a viewable field definition area 740. The overview window 710 can be configured to display an overview of a node-link model created from a hierarchy table, which is transformed from a line-item table corresponding a selected cycle definition to be analyzed.

Due to limited display size, the node-link model displayed in the overview window 710 may be significantly compressed. However, a user can see detailed information of the node-link model through the detail view window 720, which is configured to display am amplified view of a selective window 712 of the node-link model rendered in the overview window 710. The user can move around the selective window 712 (e.g., by moving scroll bars 714, swiping mouse or finger across the detail view window 720, etc.) to view different portion of the node-link model.

As illustrated, in both the overview window 710 and the detail view window 720, the node-link model can be visually represented by a plurality of nodes (e.g., 722, 723, 724, 725) and links (e.g., 726, 728) connecting the nodes.

As illustrated, the displayed node-link model has a hierarchical structure mirroring the underlying hierarchy table. Nodes represent objects organized in segments. Nodes representing objects in the same segment can be displayed in the same row. For example, nodes 723 and 724 represent objects in the same segment and can be deemed as siblings. Different segments can be displayed in different rows. For example, nodes 722, 724, and 725 are displayed in three different segments. A link between a pairs of nodes represents a parent-child relationship. For example, node 722 represents a parent of node 723, node 725 represents a child of node 724, etc.

As described further below, a node can represent one or more objects, wherein each object is associated with one corresponding record in the hierarchy table. Selected information of the records of the associated objects can be displayed in the node, such as the object identifier, the segment identifier, the associated value distribution, etc.

The format of graphical representation of the node-link model in the overview window 710 and the detail view window 720 can be similar to the cycle definition 500 depicted in FIG. 5. As noted above, two objects in two different segments can represent the same entity acting as a sender and a receiver, respectively. In certain examples, the nodes can be color coded and/or texturized to indicate different distribution types (e.g., sender or receiver) of the corresponding objects represented by the nodes. For instance, the nodes representing sender objects can be shown in one color or texture, while the nodes representing receiver objects can be shown in another color or texture.

In the depicted example, nodes 722 and 723 represent the same entity, but the node 722 represents a receiver object and the node 723 represents a sender object. The link 726 connecting the nodes 722 and 723 represents a role change of the entity (i.e., a receiver becomes a sender).

On the other hand, nodes 724 and 725 represent two different objects corresponding to two different entities. Specifically, the node 724 represents a sender object and the node 725 represent a receiver object. The link 728 connecting the nodes 724 and 725 represent a value distribution between the sender and the receiver. As depicted, the value distributed from the sender to the receiver can be displayed on or next to the link 728.

According to certain examples, the user can select one of the displayed nodes as a focus node. Such selection can be achieved, for example, by double clicking a displayed node or via other keyboard/mouse input.

In the depicted example, nodes displayed above the selected focus node can be deemed as ancestors (e.g., parent, parent of parent, etc.) of the focus node and nodes displayed below the selected focus node can be deemed as offspring (e.g., child, child of child, etc.) of the focus node. However, when the cycle definition includes recursive or iterative value distributions, a node below the focus node (e.g., an offspring node of the focus node) may distribute value to a node above the focus node (e.g., an ancestor node of the focus node).

According to certain examples, the user can specify a viewable scope of the node-link model in the viewable scope definition area 730. As described herein, the viewable scope can define which part of the node-link model is displayed in the overview window 710. Because the complete node-link model of a very complex cycle definition can include thousands or even millions of nodes, defining a smaller viewable scope allows a user to focus on selected portions of the node-link model for analysis without being overwhelmed by too much information being presented.

According to certain examples, the user can define the viewable scope by specifying a threshold or the number of viewable segments (and the nodes in those segments) around the selected focus node. For example, if the number of viewable segments is set to 10, then up to 10 segments above the selected focus node and up to 10 segments below the selected focus node can be displayed. Alternatively, the user may set the viewable scope asymmetrically around the selected focus node (e.g., by specifying an upper threshold and a lower threshold in two input fields). For example, the user may define up to 10 segments above and up to 5 segments below the focus node can be displayed.

In addition, in the viewable field definition area 740, the user can specify one or more viewable fields, which define what information can be displayed in the nodes. As described further below, the nodes are associated with records contained in the hierarchy table. The records can include a plurality of fields, such as distribution type, parent reference, unique identifier, associated value distribution, object identifier, segment identifier, etc. The viewable fields are those record fields that are selected by the user to be viewable in the displayed nodes.

For example, the user can select both segment identifier and object identifier to be viewable fields. In such a case, a displayed node represents a specific object located in one specific segment, and both the object identifier and the corresponding segment identifier are displayed in the node.

In another example, the user can select object identifier as a viewable field but exclude segment identifier from the viewable fields. In such a case, a displayed node still represents a specific object located in one specific segment, but the node displays the object identifier and no segment identifier. In yet another example, the user can select segment identifier as a viewable field but exclude object identifier from the viewable fields. In such a case, a displayed node represents a specific segment which may include many objects, and the node displays the segment identifier without individual object identifiers. Besides object identifier and segment identifier, the user can specify viewable fields to display other field information in the nodes by selecting various combinations of fields in the viewable field definition area 740. The selection can be performed, e.g., via checkboxes in a dropdown/popup menu, or the like.

Thus, via user's selection of focus node, the specification of viewable scope, and/or the specification of viewable fields, the node-link model displayed in the GUI 700 can have different structures and present different information that is tailored to the user's need. In certain examples, the focus node can be predefined or preselected by a user before displaying the node-link model in the GUI 700. Examples of visual displays of a node-link model according to a user's input are described further below.

Example 7—Example Method of Creating a Hierarchy Table from Line-Item Tables

Figure 8:
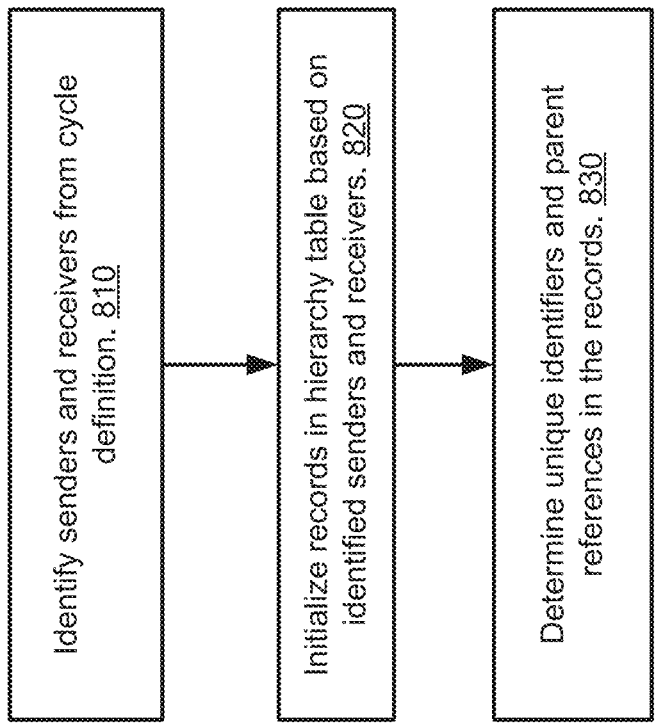
FIG. 8 is a flowchart illustrating an example overall method of creating a hierarchy table from line-item table(s).

As described above, a cycle can be defined by a user through a user interface (e.g., 310, 320), and the data underlying the cycle definition can be stored in one or more line-item tables (e.g., 400). FIG. 8 is a flowchart illustrating an example overall method 800 of creating a hierarchy table from line-item table(s). As described above, the generated hierarchy table can be stored in a memory space (e.g., 168) and used for generating a node-link model (e.g., via 178) for visual representation in a user interface (e.g., 700).

At 810, the method 800 can, in certain examples, determine the starting point of the cycle (e.g., the Telecom in the External segment) from the cycle definition data stored in the database table 122. The method 800 can identify senders and receivers of respective value distributions from a plurality of entities, e.g., by looping through rows of the line-item table(s) and evaluating a field indicating senders or receivers. For example, in the line-item table 400, the "Creditor/Debtor indicator" field can indicate the entity is a receiver (e.g., a debtor or "D") or a sender (e.g., a creditor or "C"). The segments associated with the identified senders or receivers can also be determined, e.g., from another field (e.g., "Segment text"). In certain examples, the starting point of the cycle (e.g., the Telecom in the External segment) can be identified from the user's input in the cycle definition user interface (e.g., 310, 320).

Figure 12:
FIG. 12 depicts a table illustrating senders and receivers determined from the line-item table of FIG. 4.

As an example, FIG. 12 depicts a table listing senders and receivers determined from the line-item table 400. As shown, at the External segment, one sender (Telekom) distributes value to three receivers (C.K., T.S., L.M.); at the Board segment, one sender (T.S.) distributes value to one receiver (A.H.); and so on. Note that at the L4 segment, one sender (M.V.) distributes value to five receivers, one of which is A.H., which is also a sender at the L1 segment, thus indicating a recursive value distribution.

Looping through rows of the line-item table(s) to identify senders and receivers, as depicted in step 810, can be a complex task. This is especially true if the there are many (e.g., hundreds or thousands of) line-item table(s), each table has tens of columns and thousands of rows of data values, and these tables have to be looped through many (e.g., hundreds or thousands of) times to find specific field-value combinations. Directly looping through the line-item table (s) to identify senders and receivers can be computation-intensive, if not prohibitive. As described below, an indirect table search algorithm can be used for fast searching of specific field-value combinations, including identifying senders and receivers in the line-item table(s).

Returning to FIG. 8, at 820, the method 800 can initialize records in a hierarchy table based on the identified senders and receivers. The records in the hierarchy table can be created based on respective rows in the line-item table(s), wherein the first record can correspond to the starting point of the cycle.

As an example, FIG. 13 shows an initial hierarch table 1300 comprising 29 records that are created from the corresponding rows of line-item table 400, wherein the first record can correspond to the starting point of the cycle. As shown, the records can have a plurality of fields, such as record identifier (e.g., "id"), distribution type (e.g., "type"), parent reference (e.g., "Parent id"), unique identifier (e.g., "Unique id"), associated value distribution (e.g., "Value"), currency of the value distribution (e.g., "Currency"), object identifier (e.g., "object"), segment identifier (e.g., "segment"), etc. Except for the parent reference and unique identifier, data in all other fields can be directly copied or derived from the corresponding rows in the line-item table 400. Similar to the line-item table 400, the hierarch table 1300 can include many more fields, and only selected fields are depicted in FIG. 13 for simplicity.

As described herein, each record in the hierarchy table 1300 can be associated with a corresponding object organized in a corresponding segment, as represented by the cycle definition 500 depicted in FIG. 5. For example, the first record (id=1) is associated with the Telecom object in the External segment; the second record (id=2) is associated with the C.K. object in the External segment; and so on.

Returning to FIG. 8, at 830, the method 800 can update the hierarchy table by determining the unique identifiers and parent references of the records. The determination of unique identifiers and parent references can establish hierarchical (e.g., parent-child) relationship between the objects.

As an example, FIG. 14 depicts an updated hierarch table 1400 which is the same as 1300 except that the unique identifiers and parent references of the records are determined.

As described herein, a unique identifier is assigned to a record if the record is associated with a unique object, wherein a unique object refers to an object that has a unique value distribution relationship with another object.

To determine whether an object is unique or not, several criteria can be evaluated. According to one criterion, objects representing different entities (e.g., having different object identifiers) are unique objects. For example, records 2, 4, and 6 respectively represent three different entities (C.K., T.S., and L.M.) and thus they have different unique identifiers.

The distribution type of a record indicates whether the associated object is a sender (e.g., "S") or a receiver (e.g., "R"). As described above, one entity can be represented by two different objects if the entity acts as both a sender and a receiver. Thus, according to another criterion, two records having identical object identifier (i.e., representing the same entity) can still be associated with two unique objects (thus having two different unique identifiers) if they have different distribution types. For example, records 4 and 7 have identical object identifier "T.S." but they have different unique identifiers (e.g., Unique id=4 and 7, respectively) because the former acts as a receiver and the latter acts as a sender.

According to another criterion, if one sender distributes values to M receivers (where M>1), then the sender can be represented by M unique objects, each of which has a unique identifier. For example, the hierarch table 1400 has three records (id=1, 3, and 5) associated with three different Telecom objects, indicating values are distributed from Telecom to three different receivers (C.K., T.S., and L.M.). As shown, these three records have different unique identifiers (e.g., Unique id=1, 3, and 5) because they represent three different sender-receiver pairs. Similarly, records 13, 15, and 17 are associated with three unique objects because the same sender (U.R.) distributes values to three different receivers (J.F., M.V., and C.L.), and records 19, 21, 23, 25, and 27 are associated with five unique objects because the same sender (M.V.) distributes values to five different receivers (A.M., A.N., A.P., K.M., and A.H.).

Similarly, if one receiver receives values from multiple senders, the same receiver can be represented by multiple unique objects. For example, records 8 and 28 are associated with two unique objects and have two different unique identifiers (e.g., Unique id=8, 28), even though both records indicate A.H. as a receiver. This is because A.H. in record 8 receives value distribution from T.S. in Boards segment, whereas A.H. in record 28 receives value distribution from M.V. in L4 segment, thus representing different value distribution relationship.

The unique identifier can be incremented (starting from 1) for each newly identified unique object. For example, in the hierarch table 1400, the first 28 records are associated with 28 unique objects (thus having unique identifiers ranging from 1 to 28).

On the other hand, for the last record (id=29) shown in the hierarch table 1400, the unique identifier is set to 9, which is the same as the unique identifier in record 9 (id=9). This is because the associated object (A.H.) acts as an existing sender (which distributes value to K.L.), which represents the same value distribution relationship as the object associated with record 9. This scenario occurs because of recursive value distribution. For example, after receiving a value sent back from M.V., an existing object (associated with record 9) which represents A.H. as a sender iteratively distributes the value to K.L. (which is represented by another existing object associated with record 10).

The parent-child relationship between the objects can be determined from the line-item table 400 because each row in the line-item table 400 depicts a corresponding value distribution from a sender (i.e., parent) to a receiver (i.e., child), as described above.

As described herein, the parent reference of a record associated with a specific object is the unique identifier of a parent object which directs the value distribution to the specific object.

For example, the parent reference ("Parent id") in record 10 is 9, which is the unique identifier in record 9, indicating the A.H. object associated with record 9 is the parent of K.L. object associated with record 10. This represents a sender-receiver relationship between two entities (e.g., A.H. acts as a sender and K.L. acts as a receiver).

In another example, the parent reference in record 11 is 10, which is the unique identifier in record 10, indicating the K.L. object associated with record 10 is the parent of K.L. object associated with record 11. Instead of sender-receiver relationship between two entities, this represents a role change of the same entity, e.g., K.L. changes its role from a receiver to a sender (as indicated by the change of distribution type from "R" in record 10 to "S" in record 11).

In yet another example, the parent reference in record 28 is 27, which is the unique identifier in record 27, indicating the M.V. object associated with record 27 is the parent of A.H. object associated with record 28. This represents a recursive value distribution because M.V. is a child of U.R., which is child of K.L., which is a child of A.H.

Further note that the parent references in records 1, 3, and 5 are set to 0, which indicates that the associated objects (e.g., Telecom in the External segment) serve as the starting point of the cycle.

Example 8—Example Search Queries

As noted above, to convert line-item table(s) (e.g., 400) into a hierarchy table (e.g., 1400), the method 800 can be configured to repeatedly search the line-item table(s) to evaluate relationship between different entities (e.g., senders, receivers, segments, etc.). Such searches can be constructed as search queries.

For convenience, the line-item table 400 is used as an example to illustrate the search queries and related table search algorithm. Although the line-item table 400 is a columnar table where fields are organized in columns and records of data values are stored in rows, it is to be understood that the table search algorithm described below can also be applied to row-oriented database table, e.g., by transposing the row-oriented database table.

To find a specific field-value combination in a database table, a search query can be generated. The search query can include one or more search entries. Each search entry can specify at least one column name (or field name) and a search criterion associated with the at least one column name. Responsive to the search query, the search algorithm can return row indexes for all data values that are associated with the column name and satisfy the search criterion in each search entry. Generating the search query based on a request to find specific data values in the database table can include specifying column names and formulating the search criteria associated with the column names. The syntax of a search entry can be expressed in a number of ways so long as an application running the indirect table search algorithm can interpret the column name(s) and the search criterion included in the search entry. Several text-based search queries are described below for illustration purpose.

In a first example, a search query includes only one search entry expressed as:

[1] Column Name SGTXT, Values [equals EXTERNAL]

This search query searches a database table to identify data values in the SGTXT column that equals EXTERNAL. In this example, the search criterion, which is specified within a pair of square brackets, includes an operator (e.g., equals) and an operand (e.g., EXTERNAL). In other examples, the search criterion can be specified in other formats, e.g., the operator can be expressed in symbols (e.g., "="), or the like. Performing this search query on the line-item table 400 can result in six records or row indexes (e.g., 1-6).

In a second example, a search query includes the following two search entries that are in conjunctive (logical AND) relationship:

[1] Column Name OBJNR, Values [equals TELEKOM, equals L.M.]

[2] Column Name SGTXT, Values [equals EXTERNAL]

The first search entry searches a database table to find data values in the OBJNR column that equals either TELEKOM or L.M. Note that the search criterion here includes two pairs of operator-operand that are in disjunctive (logical OR) relationship. The second search query searches the same database table to find data values in the SGTXT column that equals EXTERNAL. Because of the logical AND relationship, this search query will find matching records or row indexes whose data values satisfy both search entries. Thus, performing this search query on the line-item table 400 can result in four records or row indexes (e.g., 1, 3, 5, 6) that satisfy both search entries.

In a third example, a search query includes a single search entry expressed as:

[1] Column Name SGTXT, Value [equals L5]

This search query searches a database table to identify data values in the SGTXT column that equals L5. Performing this search query on the line-item table 400 can return empty result or NULL (i.e., no record is found).

In a fourth example, a search query includes a single search entry expressed as:

[1] Column Name OBJNR, Value [contains T*]

This search query searches a database table to identify data values in the OBJNR column that contains T*. Note that the operator "contains" indicates substring matching and the operand T* includes a wildcard character "*" indicating any value starts with letter "T." Performing this search query on the line-item table 400 can return five records or row indexes (e.g., 1, 3, 4, 5, 7).

In a fifth example, a search query includes a single search entry expressed as:

[1] Column Name OBJNR, Value [not contains *K*]

This search query searches a database table to identify data values in the OBJNR column that does not match a substring pattern *K*. Performing this search query on the line-item table 400 can return 21 records or row indexes (e.g., 4, 6, 7, 8, 9, 12, 13, 14, 15, 16, 17, 18, 19, 20, 21, 22, 23, 24, 25, 27, 28).

In a sixth example, the search query includes a single search entry expressed as:

[1] Column Name BUZEI, Value [less than 3]

This search query searches a database table to identify data values in the BUZEI column that are less than 3. Performing this search query on the line-item table 400 can return two row indexes (e.g., 1, 2).

Although specific operators are used in example criteria above, it is to be understood that other logical and/or mathematical operators can be used, such as "greater than," "greater than or equal to," "between," or the like. In some circumstances, the operators in the search criteria can be self-defined.

Example 9—Example Fast Table Search Algorithm

As noted above, directly looping through the line-item table(s) to identify senders and receivers can be computation-intensive, especially if there are a large number of line-item tables and the search must be performed repeatedly. As described herein, a fast table search algorithm (also referred to as "indirect table search algorithm") can be used to find specific data values or specific field-value combinations in a two-dimensional database table.

Figure 9:
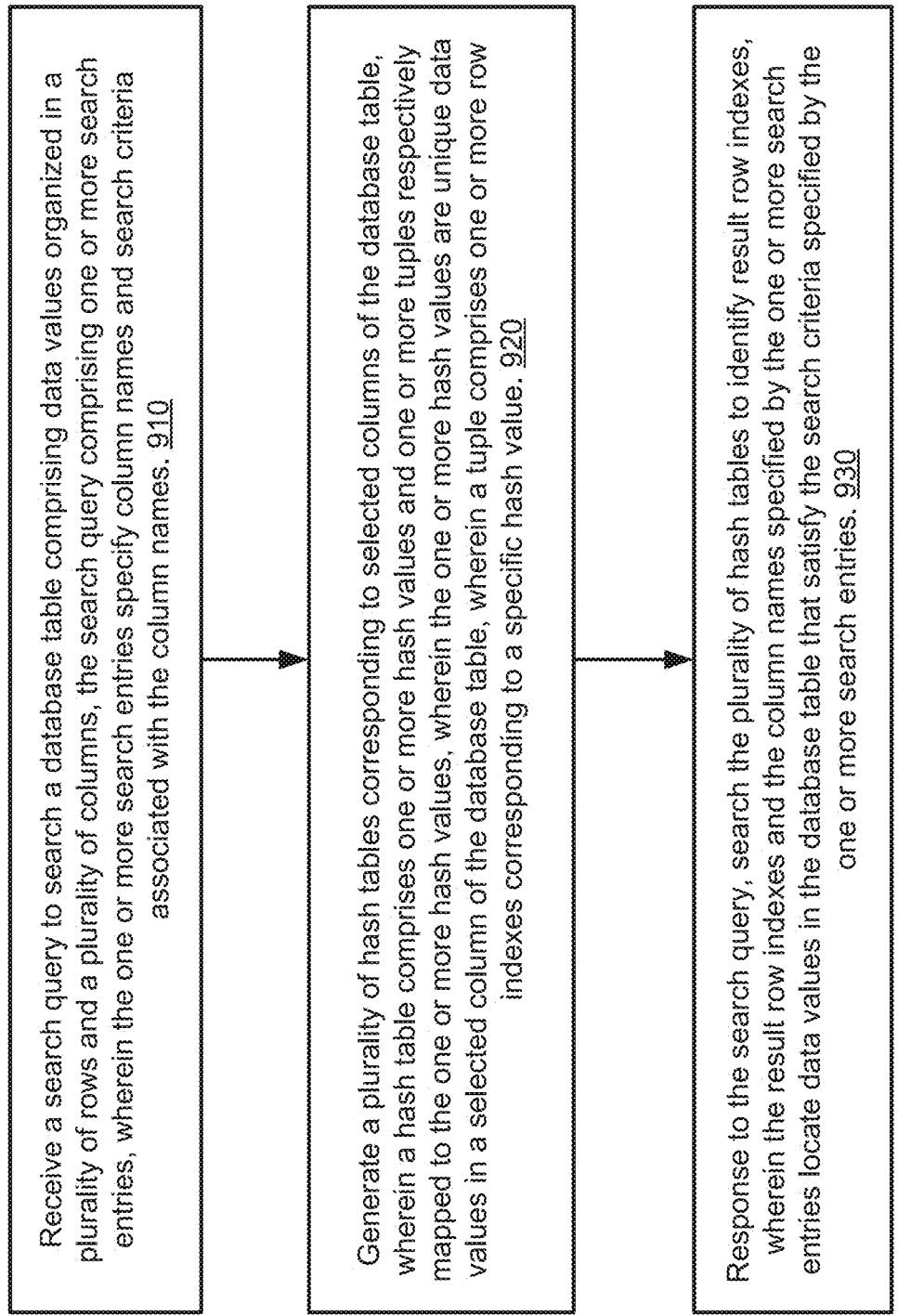
FIG. 9 is a flowchart illustrating an example overall method of indirect table search algorithm using hash tables.

FIG. 9 is a flowchart depicting an overall method of implementing the indirect table search algorithm.

At 910, the method 900 can receive a search query to search a database table (e.g., a line-item table 400) comprising data values organized in a plurality of rows and a plurality of columns. As described above, the search query can include one or more search entries, and the one or more search entries can specify column names and search criteria associated with the column names.

At 920, a plurality of hash tables corresponding to selected columns of the database table can be generated. As described herein, a hash table can include one or more hash values and one or more tuples respectively mapped to the one or more hash values. The one or more hash values are unique data values in a selected column of the database table, and a tuple can include one or more row indexes corresponding to a specific hash value.

In certain examples, to generate the hash tables, the database table can be parsed to identify unique data values in selected columns of the database table. Then, row indexes corresponding to the identified unique data values in selected columns of the database table can be determined and grouped into respective tuples.

In some circumstances, hash tables corresponding to a database table can be generated prior to receiving the search query at 910.

At 930, responsive to the search query, the method 900 can search the plurality of hash tables to identify result row indexes. As described herein, the result row indexes and the column names specified by the one or more search entries can locate data values in the database table that satisfy the search criteria specified by the one or more search entries.

Figure 10:
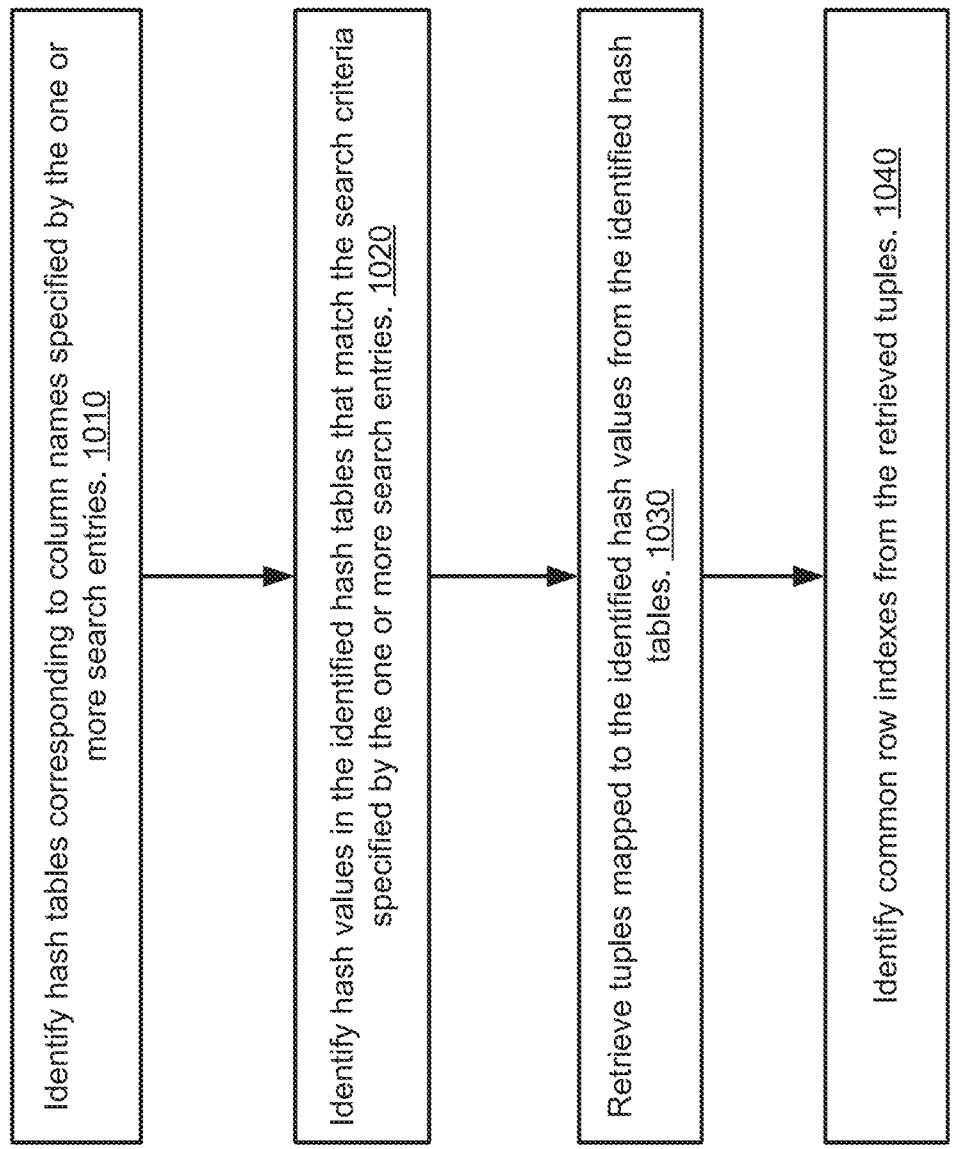
FIG. 10 is a flowchart illustrating an example method of searching hash tables according to the method of FIG. 9.

FIG. 10 is a flowchart depicting an example method 1000 of implementing the method step 930 of searching the hash tables.

At 1010, hash tables corresponding to column names specified by the one or more search entries can be identified.

At 1020, hash values in the identified hash tables that match the search criteria specified by the one or more search entries can be identified.

At 1030, tuples mapped to the identified hash values can be retrieved from the identified hash tables.

At 1040, the target row indexes can be identified from the retrieved tuples.

As described more fully below, in some circumstances, the method 1000 can count numbers of row indexes contained in the retrieved tuples in the identified hash tables, and order the identified hash tables based on the counted numbers. As described herein, the number of row indexes contained in a tuple can also be referred to as a cardinality of the tuple.

In some circumstances, the search query can include at least a first search entry and a second search entry, and the retrieved tuples can include first tuples corresponding to the first search entry and second tuples corresponding to the second search entry. As described herein, the method 1000 can identify common row indexes that are shared by the first tuples and the second tuples, and return the common row indexes as the target row indexes.

In some circumstances, to identify the common row indexes, the method 1000 can loop through the first tuples in an outer loop and loop through the second tuples in an inner loop nested inside the outer loop if the second tuples has more row indexes than the first tuples, or loop through the second tuples in an outer loop and loop through the first tuples in an inner loop nested inside the outer loop if the first tuples has more row indexes than the second tuples.

Additional details about generating hash tables and searching hash tables are described in the examples below.

Example 10—Example Hash Tables

FIG. 11 depicts six example hash tables 1110-1160 generated from the line-item table 400, respectively corresponding to six columns (i.e., BEKNZ, BUZEI, OBJNR, PAROB1, SGTXT, and ZLENR) of the line-item table 400. The number of hash tables generated from a database table can depend on which columns are relevant for the search queries. For example, the line-item table 400 depicted in FIG. 4 has eight columns. If the first column (BELNR) and the last column (Value) are not used in search queries, then it is unnecessary to generate hash tables corresponding to those two columns. As another example, assuming the Value column is used in some search queries but the ZLENR column is not used in any search queries, then a new hash table corresponding to the Value column can be generated whereas the hash table corresponding to ZLENR column (i.e., 1160) does not need to be generated.

As described above, the hash tables 1110-1160 can be generated by parsing the line-item table 400 to first identify hash values, which represent unique data values in corresponding columns, and then identify row indexes corresponding to the identified hash values. The identified row indexes can be grouped into tuples corresponding to the respective hash values.

For example, the generated hash table 1110 includes two hash values C and D, which are two unique values in the BEKNZ column. The row indexes corresponding to hash value C can be grouped in a tuple containing {1, 3, 5, 7, 9, 11, 13, 15, 17, 19, 21, 23, 25, 27}, and the row indexes corresponding to hash value D can be grouped in a tuple containing {2, 4, 6, 8, 10, 12, 14, 16, 18, 20, 22, 24, 26, 28}.

As another example, the generated hash table 1150 includes six hash values: Board, EXTERNAL, L1, L2, L3, and L4. The tuple corresponding to the hash value Board includes two row indexes {7, 8}, the tuple corresponding to the hash value EXTERNAL includes six row indexes {1, 2, 3, 4, 5, 6}, etc.

Example 11—Example Use Cases Illustrating Method for Searching Hash Tables

Several uses cases are described herein to further illustrate the method 1000 for searching hash tables depicted in FIG. 10.

In a first example, a search query includes a single search entry expressed as:

[1] Column Name SGTXT, Values [equals EXTERNAL]

This search query searches the line-item table 400 to identify data values in the SGTXT column that equals EXTERNAL. Responsive to the search query, the hash table corresponding to the SGTXT column can be identified as hash table 1150, which includes six hash values: Board, EXTERNAL, L1, L2, L3, and L4. The hash value that matches the search criterion can be identified as EXTERNAL, which is mapped to the six-element tuple {1, 2, 3, 4, 5, 6}. Since the search query includes only one search entry, such mapped tuple can be retrieved and returned as the result row indexes. In other words, rows 1, 2, 3, 4, 5, 6 of the line-item table 400 contain EXTERNAL in the SGTXT column.

In a second example, a search query includes the following three search entries that are in conjunctive (logical AND) relationship:

[1] Column Name BEKNZ, Values [equals D]
[2] Column Name SGTXT, Values [equals L3]
[3] Column ZLENR, Value [equals 8]

This search query searches the line-item table 400 to identify all debtors (receivers) in Segment L3 with ZLENR=8. Responsive to the search query, three hash tables, 1110, 1150, and 1160 can be identified corresponding to columns BEKNZ, SGTXT, and ZLENR, respectively. In the hash table 1110, D is the identified hash value matching the search criterion of the first search entry and is mapped to a fourteen-element tuple {2, 4, 6, 8, 10, 12, 14, 16, 18, 20, 24, 26, 28}. In the hash table 1150, L3 is the identified hash value matching the search criterion of the second search entry and is mapped to a six-element tuple {13, 14, 15, 16, 17, 18}. In the hash table 1160, 8 is the identified hash value matching the search criterion of the third search entry and is mapped to a two-element tuple {15, 16}. The target row indexes can be determined from the intersection of the three mapped tuples, i.e., the target row indexes represent row indexes that are common in all three mapped tuples.

Multilevel nested loops can be used to identify common row indexes in multiple tuples. To improve the searching performance, the mapped tuples of identified hash tables can be ordered based on cardinalities of the mapped tuples so that the total numbers of row indexes in the mapped tuples of identified hash tables are arranged in an ascending order from the outermost loop to the innermost loop. In any loop, if a specific row index is not found in the mapped tuples, it indicates the row index is not common in all mapped tuples. Thus, that loop can return immediately without going into its nested inner loops so as to reduce the number of executions.

In this example, the total numbers of row indexes in the mapped tuples of three hash tables 1110, 1150, and 1160 are 14, 6, and 2, respectively. Thus, two-element tuple in 1160 can be placed in the outermost loop, the six-element tuple in 1150 can be placed in the intermediate loop, and the fourteen-element tuple in 1110 can be placed in the innermost loop. The row index 15 in the two-element tuple in 1160 is found in the six-element tuple in 1150 but not in the fourteen-element tuple in 1110. In contrast, the row index 16 in the two-element tuple in 1160 is found in both the six-element tuple in 1150 and the fourteen-element tuple in 1110. Thus, the intersection of the three mapped tuples includes only row index 16. In other words, only row 6 of the line-item table 400 satisfies the search query (e.g., BEKNZ equals D, SGTXT equals L3, ZLENR equals 8).

In a third example, a search query includes the following three search entries that are in conjunctive (logical AND) relationship:

[1] Column Name BEKNZ, Values [equals C]
[2] Column Name SGTXT, Values [not equals L3]
[3] Column Name OBJNR, Values [equals M.V.]

This search query searches the line-item table 400 to identify all related creditors (senders) found in the second example described above. Responsive to the search query, three hash tables, 1110, 1150, and 1130 can be identified corresponding to columns BEKNZ, SGTXT, and OBJNR, respectively. In the hash table 1110, C is the identified hash value and is mapped to a fourteen-element tuple {1, 3, 5, 7, 9, 11, 13, 15, 17, 19, 21, 23, 25, 27}. In the hash table 1150, five hash values are identified: Board, EXTERNAL, L1, L2, and L4, which are respectively mapped to five tuples: {7, 8}, {1, 2, 3, 4, 5, 6}, {9, 10}, {11, 12}, and {19, 20, 21, 22, 23, 24, 25, 26, 27, 28}. In the hash table 1130, M.V. is the identified hash value and is mapped to a six-element tuple {16, 19, 21, 23, 25, 27}.

Similarly, multilevel nested loops can be used to identify common row indexes in these tuples. In this example, the total numbers of row indexes in the mapped tuples of three hash tables 1110, 1150, and 1130 are 14, 22, and 6, respectively. Thus, the six-element tuple in 1130 can be placed in the outermost loop, the fourteen-element tuple in 1110 can be placed in the intermediate loop, and the 22-element tuples in 1150 can be placed in the innermost loop. The row index 16 in the six-element tuple in 1130 is not found in the fourteen-element tuple in 1110 (thus it is unnecessary to search the 22-element tuples in 1150). In contrast, the remaining row indexes (i.e., 19, 21, 23, 25, 27) in the six-element tuple in 1130 can be found in both the fourteen-element tuple in 1110 and the 22-element tuples in 1150. Thus, the intersection of the mapped tuples includes five row indexes: 19, 21, 23, 25, 27. In other words, five rows (rows 19, 21, 23, 25, 27) of the line-item table 400 satisfies the search query (e.g., BEKNZ equals C, SGTXT not equal L3, OBJNR equals M.V.).

Figure 15:
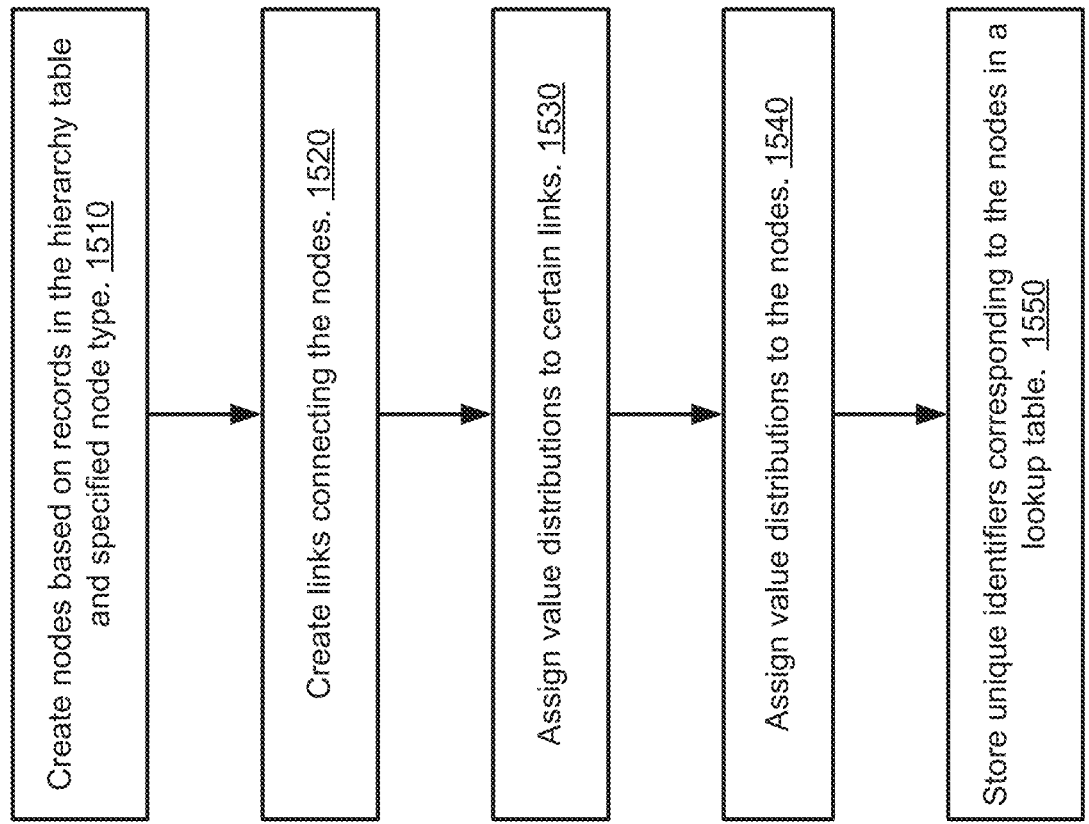
FIG. 15 is a flowchart illustrating an example overall method of generating a node-link model from a hierarchy table.

Example 12—Example Method of Generating a Complete Node-Link Model from a Hierarchy Table FIG. 15 a flowchart illustrating an example overall method 1500 of generating a complete node-link model, which includes all objects in all segments, from a hierarchy table (e.g., 1400). In certain examples, the method 1500 can be performed by the transformation display unit 178.

At 1510, the method 1500 can initially create a plurality of nodes based on records in the hierarchy table and user-specified viewable fields. Each of the created nodes represents a unique combination of viewable fields and distribution type of the records contained in the hierarchy table. Thus, each node can represent one or more objects associated with the corresponding records in the hierarchy table. In certain examples, the unique combinations of viewable fields and distribution type can be identified by using the fast table searching algorithm described above with reference to FIGS. 9-11 (e.g., by creating hash tables from the hierarchy table and then indirectly searching the hash tables).

As described above, a user can specify one or more viewable fields (e.g., in the viewable field definition area 740) which determines what information can be presented in the displayed nodes. To generate a complete node-link model, the viewable fields can be selected (or predefined by default) to include both object identifier and segment identifier.

As an example, the nodes initially created from the hierarchy table 1400 can be stored in a data table 1600 as illustrated in FIG. 16. In this example, 20 nodes (with node_id ranging from 1 to 20) are created from 29 records contained in the hierarchy table 1400. Each node represents a unique combination of distribution type, segment identifier, and object identifier in the records. For example, records 1, 3, and 5 in the hierarchy table 1400 share the same distribution type ("S"), object identifier ("Telecom"), and segment identifier ("External"). Thus, those three records correspond to one unique node (node_id=1). Similarly, record 2 corresponds to one unique node (node_id=2) because it is the only record having a unique combination of distribution type ("R"), object identifier ("C.K."), and segment identifier ("External"). As another example, record 19, 21, 23, 25, and 27 correspond to one unique node (node_id=15) because they share the same distribution type ("5"), object identifier ("M.V."), and segment identifier ("L4"). For each node, the unique identifiers of the corresponding records can be stored in a field (e.g., "unique id"). The distribution type ("type"), segment identifier ("segment"), object identifier ("object"), and some other fields (e.g., "Currency") can be copied from the corresponding fields of the records contained in the hierarchy table.

Returning to FIG. 15, at 1520, the method 1500 can create links connecting the created nodes. The links can be created by looping through the records in the hierarchy table 1400 and evaluating the parent references in the records.

As an example, FIG. 17 shows a data table 1700 underlying the node-link model generated from the data table 1600 (some of the fields, e.g., "object," "segment," etc., are omitted for simplicity). Each row in the data table 1700 represents a created link.

Corresponding to the "unique id" field, the data table 1700 includes an additional field "parent id," which contains corresponding parent references (i.e., the unique identifier of the parent objects) in the records of the hierarchy table 1400. For example, from the hierarchy table 1400, it can be determined that the parent reference in record 2 is 1, the parent reference in record 4 is 3, the parent reference in records 13, 15, and 17 is 12, etc. The last row of data table 1700 also shows that the parent reference in record 9 can also be 28 (in addition to 8), indicating a recursive value distribution scenario.

In addition, corresponding to the "node_id" field, the data table 1700 includes an additional field "parent_node_id," the value of which can be looked up from the "node_id" field in the data table 1600 based on the corresponding "parent id." For example, for nodes 2, 3, and 4, their corresponding parent_id (i.e., the unique id of parent objects) are 1, 3, and 5, respectively. From the data table 1600, it can be determined that these three different parent_id values all correspond to node_id=1. Thus, the parent_node_id is set to 1 for nodes 2, 3, and 4, indicating node 1 is the parent of all three nodes. Similarly, the parent_node_id of node 5 is set to 3, the parent_node_id of nodes 16, 17, 18, 19, and 20 is set to 15, etc. Notably, the parent_node_id of node 7 is set to 6 in one row and 20 in another row, indicating the node 7 has two parent nodes (6 and 20).

Thus, the created links can establish parent-child relationship between the nodes, wherein each node can represent one or more objects associated with the records having the unique identifiers. The parent-child relationship between a pair of nodes can represent a sender-receiver relationship, or indicate a role change. For example, the first three links (rows 1, 2, 3) represent sender-receiver relationship between three pairs of nodes. This is because the objects represented by the nodes have parent-child relationship according to the hierarchy table 1400 (e.g., the first link connects node 1 representing the Telecom object to node 2 representing the C.K. object). In another example, the fourth link (row 4) represents a role change, because it connects node 4 representing the T.S. object which acts as a receiver to node 7 representing the T.S. object which acts as a sender.

Returning to FIG. 15, at 1530, the method 1500 can assign value distributions to some of the created links. The value distributions assigned to the links can be determined based on corresponding value distributions in the records of the hierarchy table 1400.

As an example, FIG. 18 shows a data table 1800 of the node-link model generated from the data table 1700 (some of the fields, e.g., "object," "segment," etc., are omitted for simplicity). The data table 1800 is identical to 1700 except for an added "Value" field, which contains positive value distributions assigned to links that represent sender-receiver relationship between the connected nodes.

In the depicted example, value distribution assigned to a link represent aggregated value distributions between a pair of nodes which respectively act as a sender and a receiver. The aggregated value distributions are determined based on records of the associated objects represented by the pair of nodes.

For example, as noted above, the first link (row 1) represents a sender-receiver relationship between node 1 (representing the Telecom object) and node 2 (representing the C.K. object). Since each node represents only one object, the aggregated value distribution for the first link is the same as value distribution in record 2 of the hierarchy table 1400 (i.e., Value=3,000.00). Similarly, the aggregated value distributions for the second link is the same as value distribution in record 4 of the hierarchy table 1400 (i.e., Value=2,500.00), the aggregated value distributions for the third link is the same as value distribution in record 6 of the hierarchy table 1400 (i.e., Value=5,000.00), and so on.

Returning to FIG. 15, at 1540, the method 1500 can assign value distributions to the created nodes. For nodes representing senders, the assigned value distributions are negative, indicating value decrease after the value distribution. For nodes representing receivers, the assigned value distributions are positive, indicating value increase after the value distribution.

The value distribution assigned to a node representing a sender is aggregated value distributions sent from all objects represented by the node, and can be determined based on records of those objects. For nodes representing receivers, the assigned value distributions are identical to the value distributions assigned to the links connecting to the nodes.

As an example, FIG. 19 shows a data table 1900 of the node-link model updated from the data table 1800 (some of the fields, e.g., "parent_node_id," etc., are omitted for simplicity). In this example, the "Value" field shows aggregated value distributions assigned to the respective nodes. For example, the second node (node_id=2), which represents a receiver ("R"), is assigned a positive value distribution (3,000.00) which is the same as the value distribution assigned to the second link in the data table 1800. On the other hand, the first node (node_id=1), which represents a sender ("S"), is assigned a negative value distribution (−10,500.00), which is an aggregate of value distributions in three different records with unique identifiers 1, 3, and 5, which are (−3,000), (−2,500), and (−5,000), respectively.

Returning to FIG. 15, at 1550, the method 1500 can store unique identifiers corresponding to the nodes in a lookup table. FIG. 20 depicts one example lookup table 2000 generated from the data table 1900. As shown, the lookup table 2000 can include only two fields ("node_id" and "unique id") extracted from the data table 1900. Thus, the look up table 2000 can map records (associated with "unique id") to respective nodes (identified by "node_id"). Thus, the smaller lookup table 2000 can be used to quickly identify records from the nodes, and the larger data table 1900 can be deleted to save memory space, if needed. In certain cases, the step 1550 can be optional.

Figure 21:
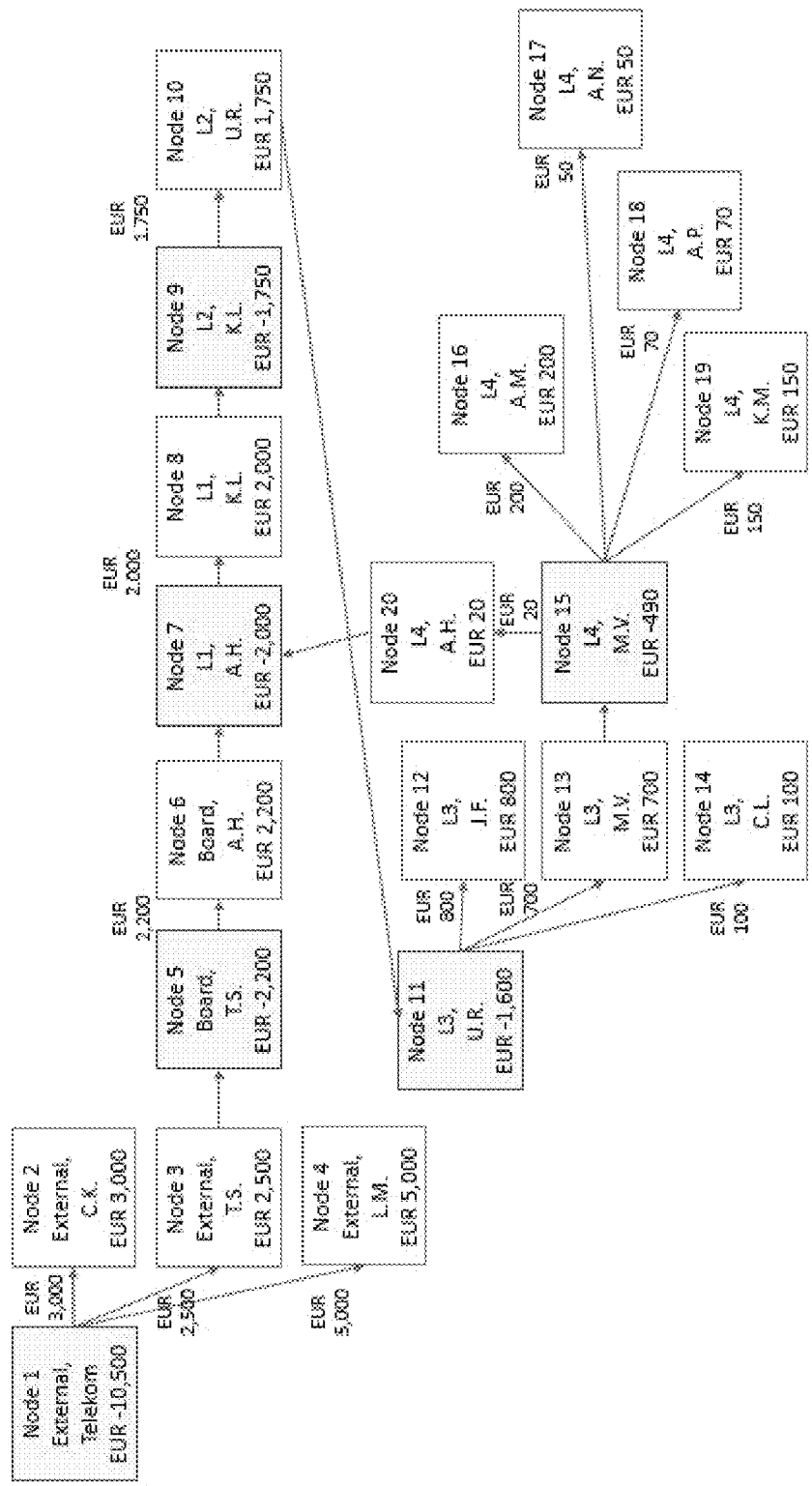
FIG. 21 is a visual representation of the node-link model defined by the data table of FIG. 19.

The data table 1900 can be used to generate a visual representation of the node-link model created from the hierarchy table 1400. As an example, FIG. 21 depicts a graphical representation of the node-link model 2100 defined by the data table 1900. As described above, the node-link model 2100, or a portion of it, can be displayed in a graphical user interface (e.g., 700).

As shown, the node-link model 2100 includes 20 nodes (Nodes 1-20) connected by a plurality of links (represented by arrows). Object identifier and segment identifier are displayed in each node (because the viewable fields include both object identifier and segment identifier).

The links characterize parent-child relationship between the nodes and the objects they represent. For example, the arrows connecting Node 1 to Nodes 2, 3, and 4 indicates Telekom is the parent of C.K., T.S., and L.M.

The sender-receiver relationship between the nodes can be color or pattern coded. In the depicted example, the shaded nodes (e.g., Nodes 1, 5, 7, 9, 11, and 15) represent senders, and the other unshaded nodes represent receivers. Consistent with the cycle definition 500 depicted in FIG. 5, the same entity acting in both sender and receiver roles can be represented by two different nodes. For example, Node 3 and Node 5 both represent the same entity (T.S.), but the former represents the T.S. object acting as a receiver in the External segment, whereas the latter represent the T.S. object acting as a sender in the Board segment.

As shown, positive value distributions assigned to links that represent sender-receiver relationship between the connected nodes are shown next to those links (e.g., EUR 3,000 is distributed from Telecom to C.K., EUR 2,000 is distributed from T.S. to A.H., etc.). In addition, value distributions assigned to nodes (e.g., the "Value" column data in data table 1900) can be displayed in the nodes. For example, nodes representing receivers have positive assigned value distributions, and nodes representing senders have negative assigned value distributions.

Thus, the node-link model 2100 provides a visual overview of the hierarchical structure of the cycle defined by the line-item table 400, from which the hierarchy table 1400 is created. It can reveal parent-child relationship between different objects, including recursive value distribution, such as the link between Node 20 and Node 7.

Example 13—Example Method of Visualizing a Portion of the Node-Link Model

Figure 22:
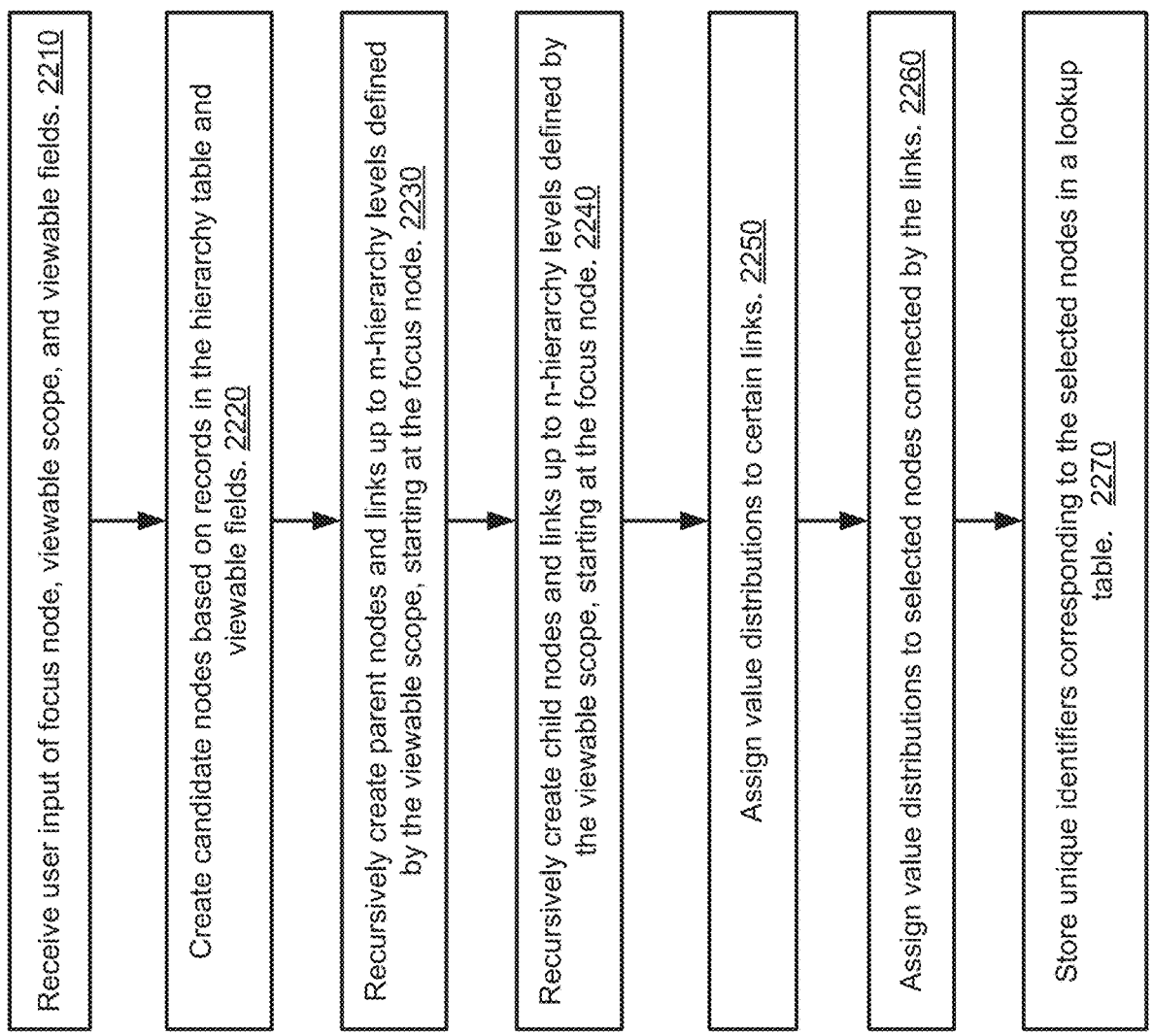
FIG. 22 is a flowchart of an example method for visualizing a portion of a node-link model.

FIG. 22 depicts a flowchart of an example method 2200 of visualizing a portion of the node-link model (e.g., 2100) generated from a hierarchy table. In certain examples, the method 2200 can be performed by the transformation display unit 178.

At 2210, the method 2200 can receive a user's input of focus node, viewable scope, and viewable fields. As described above, through a user interface, the user can select one of the displayed nodes as a focus node, and can specify viewable scope of the node-link model (e.g., in the viewable scope definition area 730) and one or more viewable fields (e.g., in the viewable field definition area 740).

At 2220, the method 2200 can create a plurality of candidate nodes based on records in the hierarchy table and viewable fields. As described below, some of the candidate nodes connected by links may be selected for display while other unlinked candidate nodes may not be displayed. Similar to step 1510 of method 1500, each of the candidate nodes represents a unique combination of viewable fields and distribution type of the records contained in the hierarchy table. Thus, each node can represent one or more objects associated with the corresponding records in the hierarchy table. Similarly, the unique combinations of viewable fields and distribution type can be identified by using the fast table searching algorithm described above with reference to FIGS. 9-11 (e.g., by creating hash tables from the hierarchy table and then indirectly searching the hash tables).

At 2230, the method 2200 can recursively create parent nodes and links up to a predefined number (e.g., m) of hierarchy levels, starting at the focus node. The number of hierarchy levels (m) can be specified by the viewable scope.

At 2240, the method 2200 can recursively create child nodes and links up to a predefined number (e.g., n) of hierarchy levels, starting at the focus node. Similarly, the number of hierarchy levels (n) can be specified by the viewable scope.

As described herein, m can be the same as, or different from n. Examples of recursively creating the parent and child nodes and related links are described further below.

At 2250, the method 2200 can assign value distributions to some of the created links. Similar to step 1530 of method 1500, the value distributions assigned to the links can be determined based on corresponding value distributions in the records of the hierarchy table 1400.

At 2260, the method 2200 can assign value distributions to the selected nodes connected by the links. Similar to step 1540 of method 1500, the value distribution assigned to a node representing a sender can be aggregated value distributions sent from all objects represented by the node and can be determined based on records of those objects, while the value distribution assigned to a node representing a receiver can be identical to the value distributions assigned to the link connecting to the node.

Optionally, at 2270, the method 2200 can store unique identifiers corresponding to the selected nodes in a lookup table. Similar to step 1550 of method 1500, the created look up table can map records (associated with "unique id") to respective nodes (identified by "node_id").

Several use cases are described below to further illustrate the method 2200.

Example 14—Example Use Case A: User Selects a Focus Node and Specify Viewable Fields to Include Segment Identifier but Not Object Identifier FIGS. 23-26 illustrate a use case where a user can interactively visualize a selected portion of the node-link model 2100.

Figure 23:
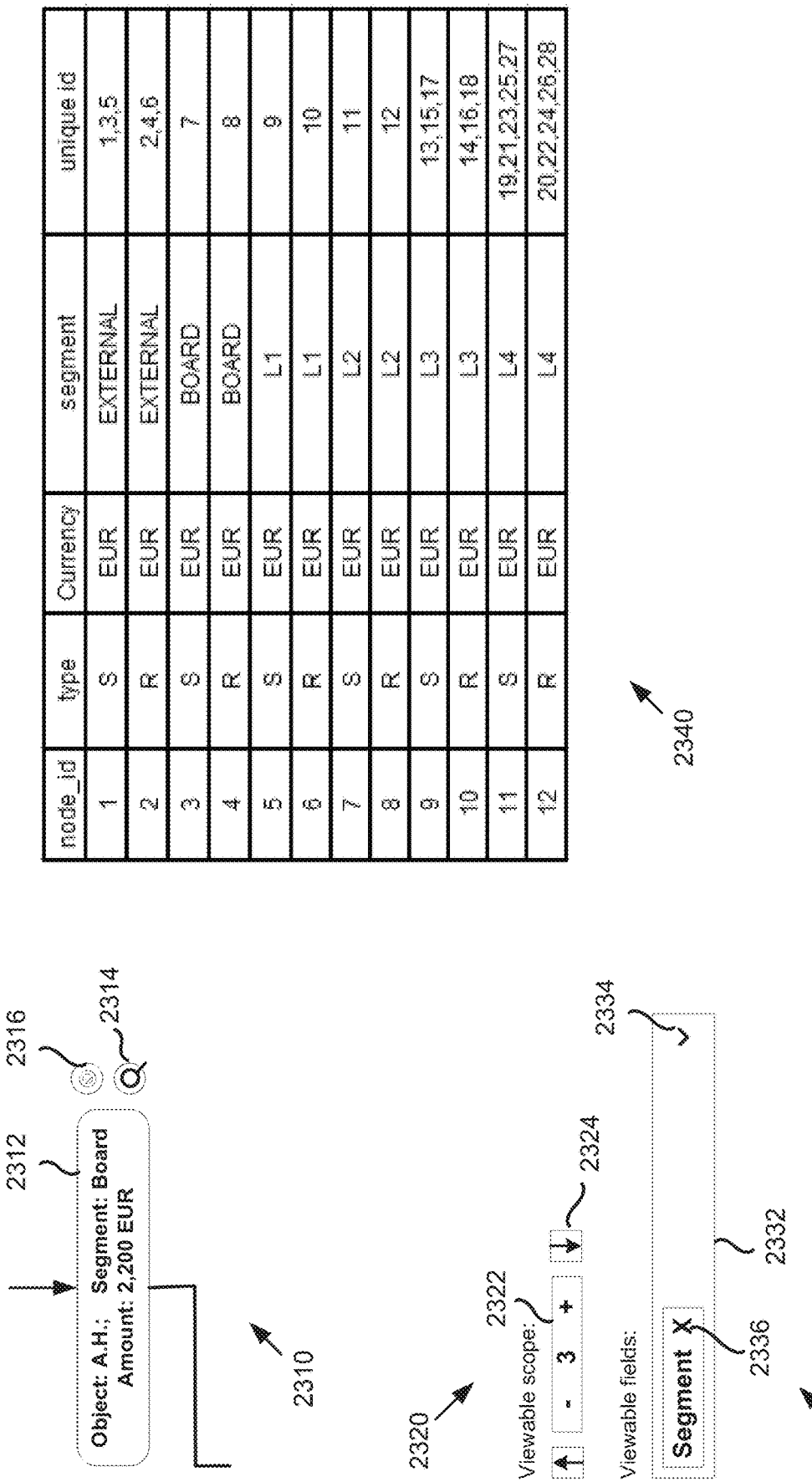
FIG. 23 depicts certain user input to define focus node, viewable scope, and viewable fields, and a data table representing created candidate nodes, according to a first use case.

FIG. 23 depicts a user's input 2310 to define a focus node, the user's input 2320 specifying the viewable scope, and the user's input 2330 specifying the viewable fields (e.g., corresponding to step 2210 of the method 2200). In addition, FIG. 23 a data table 2340 representing candidate nodes (e.g., created by step 2220 of the method 2200).

As shown, the user can select a displayed node 2312 and designate it as a focus node. For example, after clicking the node 2312, two icons 2314 and 2316 can appear next to the node 2312. Clicking one icon, e.g., 2314, can designate the node 2312 as the focus node. Clicking the other icon, e.g., 2316, can cancel such designation (and the user can select another node as the focus node, if necessary). In the depicted example, the user selected focus node 2312 corresponds to the A.H. object in the Board segment, with an assigned value distribution 2,200 (currency EUR). This corresponds to Node 6 displayed in FIG. 21. According to the lookup table 2000, this focus node represents the A.H. object associated with a unique identifier 8.

As noted above, the user can define the viewable scope in a viewable scope definition area (e.g., 730). For example, the user can specify a threshold in a text box 2322, which defines the number of viewable segments (or hierarchy levels) around the selected focus node 2312. The user can change the threshold, e.g., by clicking the plus or minus sign, or up/down arrows 2324 next to the text box 2322. In the depicted example, the threshold is set to 3, indicating that up to 3 segments above the selected focus node and up to 3 segments below the selected focus node can be viewable.

As noted above, the use can specify one or more viewable fields in a viewable field definition area (e.g., 740) to define what information can be displayed in the nodes. For example, the user selected viewable fields can be shown in a field box 2332. The user can click an arrow 2334 to open a dropdown menu to select additional viewable fields, or click a cross 2336 to remove a previously selected viewable field. In the depicted example, the user specified viewable fields include "Segment" (indicating segment identifier), but no object identifier. Thus, the displayed nodes represent segments, each of which may include one or more objects. The displayed nodes show the segment identifier without individual object identifiers.

The candidate nodes created from the hierarchy table 1400 can be stored in the data table 2340. In this example, 12 candidate nodes (with node_id ranging from 1 to 12) are created from 29 records contained in the hierarchy table 1400. Each candidate node represents a unique combination of distribution type and segment identifier in the records (note that object identifier is not evaluated because it is not a selected viewable field). For example, records 2, 4, and 6 in the hierarchy table 1400 share the same distribution type ("R") and segment identifier ("External"). Thus, those three records correspond to one unique candidate node (node_id=1). For each candidate node, the unique identifiers of the corresponding records can be stored in a field (e.g., "unique id"). The distribution type ("type"), segment identifier ("segment"), and some other fields (e.g., "Currency") can be copied from the corresponding fields of the records contained in the hierarchy table. Note that candidate node 4 represents the selected focus node because its unique id=8.

FIG. 24 depicts two data tables 2410, 2420 representing linked nodes recursively created from the user defined focus node (i.e., object A.H. in Board segment, or Node 6 in FIG. 21), based on the number of viewable segments (or hierarchy levels) defined by the viewable scope. Specifically, data table 2410 represents the focus node and its ancestor nodes with links up to three levels above the focus node (e.g., created by step 2230), and data table 2420 further includes recursively created offspring nodes with links up to three levels below the focus node (e.g., created by step 2240).

Similar to step 1520 of the method 1500, the links can be created by looping through the records in the hierarchy table 1400 and evaluating the parent references in the records. Each row in the data tables 2410, 2420 represents a created link (some of the fields, e.g., "object," "segment," etc., are omitted from the data tables for simplicity).

For example, the first row in the data table 2410 represents the focus node (candidate node 4) and a link to its parent node. The focus node has a unique identifier 8, and the parent reference is 7 according to record 8 of the hierarchy table 1400. Thus, candidate node 3 is determined to be the parent of the focus node (e.g., the unique id=7 corresponds to node_id=3 in the data table 2340).

Similarly, it can be recursively determined that candidate node 2 is the parent of candidate node 3, and candidate node 1 is the parent of candidate node 2. Thus, the three rows in the data table 2410 represent the focus node and its links to its ancestor nodes that are up to three levels above the focus node. Note that as the parent of candidate node 3, the candidate node 2 only represents the T.S. object associated with unique id=4. This is because the C.K. and L.M. objects with respective unique id=2 and 6 (i.e., siblings of the T.S. object) are not parent of the A.H. object represented by the focus node. Similarly, as the parent of candidate node 2, the candidate node 1 only represents the Telecom object associated with unique id=3 (i.e., not represent the other two Telecom objects with respective unique id=1 and 5).

The data table 2420 includes the same three rows in 2410 and have three additional rows (i.e., rows 4-6), which represent offspring nodes up to three segments below the focus node. For example, it can be recursively determined that the candidate node 5 (corresponding unique id=9) is the child of candidate node 4, the candidate node 6 (corresponding to unique id=10) is the child of candidate node 5, and the candidate node 7 (corresponding to unique id=11) is the child of candidate node 6. As shown, only 7 selected candidate nodes (node_id=1-7) are linked in the data table 2420. These linked candidate nodes are also referred to as Nodes 1-7 in this example.

Referring to FIG. 25, value distributions assigned to some of the links are shown in the "Value" field of the data table 2510. Similarly, value distribution assigned to a link represent aggregated value distributions between a pair of candidate nodes which respectively act as a sender and a receiver, wherein the aggregated value distributions are determined based on records of the associated objects represented by the pair of candidate nodes.

For example, the third link (row 3) represents a sender-receiver relationship between Node 1 (representing the Telecom object with a unique identifier 3) and Node 2 (representing the T.S. object with unique identifiers 4). Since each of Nodes 1-2 represents only one object, the aggregated value distribution for the third link is the same as value distribution in record 4 of the hierarchy table 1400 (i.e., Value=2,500.00).

Still referring to FIG. 25, value distributions assigned to the linked candidate nodes are shown in the "Value" field of the data table 2520. In the depicted examples, the candidate nodes in the data table are 2520 are sorted based on the node_id. For candidate nodes representing senders, the assigned value distributions are negative, indicating value decrease after the value distribution. For candidate nodes representing receivers, the assigned value distributions are positive, indicating value increase after the value distribution. The value distribution assigned to a candidate node representing a sender is aggregated value distributions sent from all objects represented by the candidate node. For candidate nodes representing receivers, the assigned value distributions are identical to the value distributions assigned to the links connecting to the candidate nodes.

For example, Node 2 (node_id=2), which represents a receiver ("R"), is assigned a positive value distribution (2,500.00) which is the same as the value distribution assigned to the third link in the data table 2510. On the other hand, Node 1 (node_id=1), which represents a sender ("S"), is assigned a negative value distribution (−2,500.00), which is the value distribution in record 3 of the hierarchy table 1400.

FIG. 25 also shows a lookup table 2530, which includes two fields ("node_id" and "unique id") extracted from the data table 2520. Similarly, the smaller lookup table 2530 can be used to quickly identify records from the nodes, and the larger data table 2520 can be deleted to save memory space, if needed.

Figure 26:
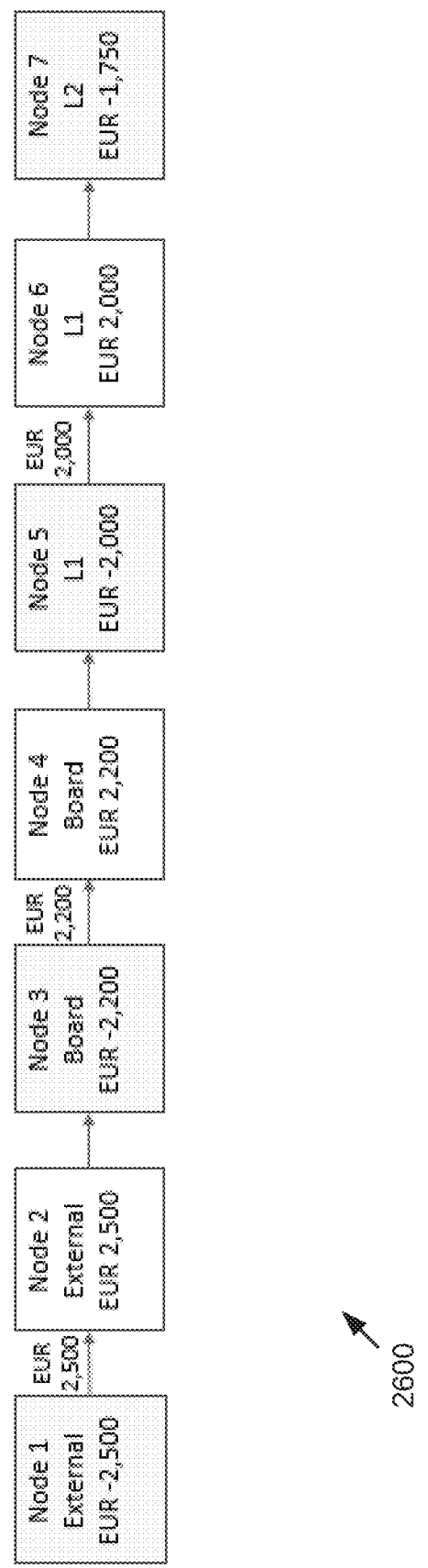
FIG. 26 is a visual representation of a portion of the node-link model depicted in FIG. 21, according to the first use case.

The data table 2520 can be used to generate a visual representation of a portion of the node-link model 2100, responsive to the user's definition of focus node, viewable scope, and viewable fields, as depicted in FIG. 23. As an example, FIG. 26 depicts a graphical representation of a partial node-link model 2600, based on the user's selection of the focus node (e.g., Node 6 in FIG. 21), the specified viewable scope (e.g., 3) and viewable fields (e.g., "Segment").

As shown, the partial node-link model 2600 includes 7 candidate nodes (Nodes 1-7) connected by the links. Note that the other 5 candidate nodes in the data table 2340 (e.g., candidate nodes with node_id=8-12) are not displayed because they are not connected by the links created in the data table 2420. In other words, those candidate nodes are outside the viewable scope. As indicated in the data table 2420, each displayed node represents only one respective object (e.g., Nodes 1-7 respectively represent objects associated with records 3, 4, 7, 8, 9, 10, and 11 of the hierarchy table 1400). In addition, each node displays the corresponding segment identifier but no object identifier (because the object identifier is excluded from the viewable fields).

Similarly, the links characterize parent-child relationship between the nodes and the objects they represent. For example, Node 1 is the parent of Node 2, which is the parent of Node 3, etc. The sender-receiver relationship between the nodes can be color or pattern coded. In the depicted example, the shaded nodes (e.g., Nodes 1, 3, 5, and 7) represent senders, and the unshaded nodes (Nodes 2, 4, and 6) represent receivers. Similarly, positive value distributions assigned to links that represent sender-receiver relationship between the connected nodes are shown next to those links (e.g., EUR 2,500 is distributed from Node 1 to Node 2, etc.), and value distributions assigned to nodes can be displayed in the nodes.

Thus, the partial node-link model 2600 provides a more focused view of the node-link model 2100, centered on the selected focus node (i.e., Node 6 in FIG. 21). The viewable scope specified by the user determines which neighboring nodes of the focus node can be displayed. For example, the number of segments separating the focus node and a neighboring node is less than or equal to a threshold (e.g., 3 in the depicted example) defined by the viewable scope.

Example 15—Example Use Case B: User Selects Another Focus Node and Specify Viewable Fields to Include Segment Identifier but not Object Identifier FIGS. 27-30 illustrate another use case where a user can interactively visualize a selected portion of the node-link model 2100.

Figure 27:
FIG. 27 depicts certain user input to define focus node, viewable scope, and viewable fields, and a data table representing created candidate nodes, according to a second use case.

As shown in FIG. 27, the user's input 2710 selects another focus node which corresponds to Node 7 displayed in FIG. 26. According to the lookup table 2530, this focus node represents the K.L. object in L2 segment and is associated with a unique identifier 11. In addition, the user's input 2720 specifies the same viewable scope (e.g., 3) as in 2320, and the user's input 2730 specifies the same viewable fields (i.e., include segment identifier but exclude object identifier) as in 2330.

FIG. 27 also shows a data table 2740 for the created candidate nodes (with node_id ranging from 1 to 12). Because no change is made to the viewable scope and viewable fields, the data table 2740 is the same as 2340 (i.e., there are 12 unique combinations of distribution type and segment identifier in the records). Note that candidate node 7 represents the selected focus node because its unique id=11.

As shown in FIG. 28, the data table 2810 represents the focus node and its ancestor nodes with links up to three levels above the focus node, and the data table 2820 further includes recursively created offspring nodes with links up to three levels below the focus node. For example, it can be recursively determined that candidate node 4 is the parent of candidate node 5, which is the parent of candidate node 6, which is the parent of candidate node 7, which is the focus node. Likewise, it can be recursively determined that candidate node 10 is the child of candidate node 9, which is child of candidate node 8, which is the child of candidate node 7, which is the focus node. As shown, only 7 selected candidate nodes (node_id=4-10) are linked in the data table 2820. These linked candidate nodes are also referred to as Nodes 4-10 in this example.

Note that as the child of Node 8, Node 9 represents three objects (e.g., U.R. objects in the L3 segment) associated with three different unique identifiers 13, 15, and 17 (corresponding to records 13, 15, and 17 of the hierarchy table 1400). Similarly, as the child of Node 9, Node 10 represents three objects (e.g., J.F., M.V., and C.L. objects in the L3 segment) associated with three different unique identifiers 14, 16, and 18 (corresponding to records 14, 16, and 18 of the hierarchy table 1400).

Similar to FIG. 25, FIG. 29 shows a data table 2910 containing value distributions assigned to some of the links representing sender-receiver relationship between candidate nodes, a data table 2920 containing value distributions assigned to the linked candidate nodes, and a data table 2930 containing two fields ("node_id" and "unique id") extracted from the data table 2920.

Note that the value distribution assigned to the link between Nodes 9 and 10 is 1,600, which is the aggregation of value distributions in three different records with unique identifiers 14, 16, and 18, which are 800, 700, and 100, respectively. This indicates that the three objects (J.F., M.V., and C.L.) represented by Node 10 collectively receives 1,600 value distribution from the three objects (U.R.) represented by Node 9. Similarly, the value distribution assigned to Node 9 is (−1,600), which is an aggregate of value distributions in three records 13, 15, and 17, which are (−800), (−700), and (−100), respectively.

Figure 30:
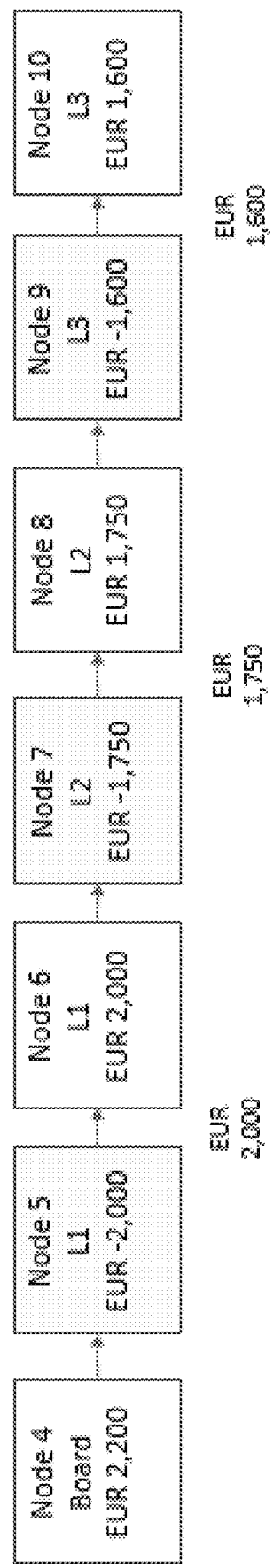
FIG. 30 is a visual representation of a portion of the node-link model depicted in FIG. 21, according to the second use case.

Similarly, FIG. 30 depicts a graphical representation of a partial node-link model 3000 created based on the data table 2920, responsive to the user's definition of focus node, viewable scope, and viewable fields, as depicted in FIG. 27.

As shown, the partial node-link model 3000 includes 7 candidate nodes (Nodes 4-10) connected by the links, while the other 5 candidate nodes in the data table 2740 (e.g., candidate nodes with node_id=1-3 and 11-12) are not displayed because they are outside the viewable scope. As indicated in the data table 2820, while each of the Nodes 4-8 represents only one respective object (e.g., objects associated with records 8-12 of the hierarchy table 1400), Node 9 represents three different U.R. objects and Node 10 represents J.F., M.V., and C.L. objects. In addition, each node displays the corresponding segment identifier but no object identifier (because the object identifier is excluded from the viewable fields).

Similarly, the links characterize parent-child relationship between the nodes and the objects they represent. For example, Node 4 is the parent of Node 5, which is the parent of Node 6, etc. The sender-receiver relationship between the nodes can be color or pattern coded. In the depicted example, the shaded nodes (e.g., Nodes 5, 7, and 9) represent senders, and the unshaded nodes (Nodes 4, 6, 8, and 10) represent receivers. Likewise, positive value distributions assigned to links that represent sender-receiver relationship between the connected nodes are shown next to those links, and value distributions assigned to nodes can be displayed in the nodes.

Thus, the partial node-link model 3000 provides a more focused view of the node-link model 2100, centered on the newly selected focus node (i.e., Node 7 in FIG. 26). The viewable scope specified by the user determines which neighboring nodes of the focus node can be displayed.

Example 16—Example Use Case C: User Selects Another Focus Node and Specify Viewable Fields to Include Object Identifier but not Segment Identifier FIGS. 31-34 illustrate another use case where a user can interactively visualize a selected portion of the node-link model 2100.

Figure 31:
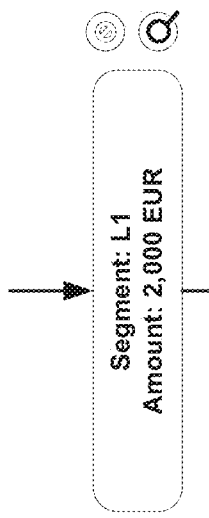
FIG. 31 depicts certain user input to define focus node, viewable scope, and viewable fields, and a data table representing created candidate nodes, according to a third use case.

As shown in FIG. 31, the user's input 3110 selects another focus node which corresponds to Node 6 displayed in FIG. 30. According to the lookup table 2930, this focus node represents the K.L. object in L1 segment and is associated with a unique identifier 10. The user's input 3120 specifies the same viewable scope (e.g., 3) as in 2920. In addition, the user's input 3130 specifies the viewable fields include "Object" (indicating object identifier), but no segment identifier (i.e., the "Segment" is removed from the viewable fields).

FIG. 31 also shows a data table 3140 which includes 19 candidate nodes (with node_id ranging from 1 to 19) created from the hierarchy table 1400. Each candidate node represents a unique combination of distribution type and object identifier in the records (note that segment identifier is not evaluated because it is not a selected viewable field). For example, records 1, 3, and 5 in the hierarchy table 1400 share the same distribution type ("S") and object identifier ("Telecom"). Thus, those three records correspond to one unique candidate node (node_id=1). Note that candidate node 8 represents the selected focus node because its unique id=10.

As shown in FIG. 32, the data table 3210 represents the focus node and its ancestor nodes with links up to three levels above the focus node, and the data table 3220 further includes recursively created offspring nodes with links up to three levels below the focus node. For example, it can be recursively determined that candidate node 5 is the parent of candidate node 6, which is the parent of candidate node 7, which is the parent of candidate node 8, which is the focus node. Likewise, it can be recursively determined that candidate node 11 is the child of candidate node 10, which is child of candidate node 9, which is the child of candidate node 8, which is the focus node. As shown, only 7 selected candidate nodes (node_id=5-11) are linked in the data table 3220. These linked candidate nodes are also referred to as Nodes 5-11 in this example.

Note that as the child of candidate node 10, Node 11 represents three objects (e.g., U.R. objects in the L3 segment) associated with three different unique identifiers 13, 15, and 17 (corresponding to records 13, 15, and 17 of the hierarchy table 1400).

Similar to FIG. 29, FIG. 33 shows a data table 3310 containing value distributions assigned to some of the links representing sender-receiver relationship between candidate nodes, a data table 3320 containing value distributions assigned to the linked candidate nodes, and a data table 3330 containing two fields ("node_id" and "unique id") extracted from the data table 3320.

Note that the value distribution assigned to the link between Nodes 5 and 6 is 2,200, which is the value distribution in record 8 (note that the value distribution of 20 recursively sent from the M.V. object in the L4 segment is not aggregated because the only parent reference in record 8 is 7, which is associated with the T.S. object). Similarly, the value distribution assigned to Node 11 is (−1,600), which is an aggregate of value distributions in three records 13, 15, and 17, which are (−800), (−700), and (−100), respectively.

Figure 34:
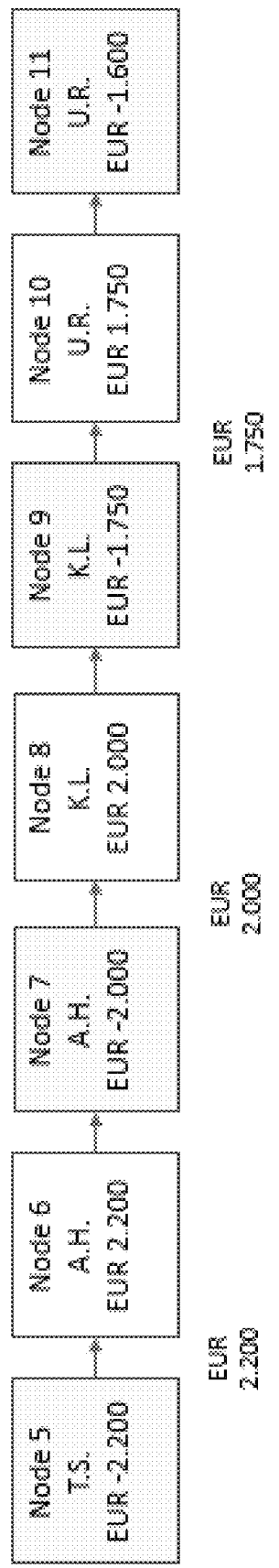
FIG. 34 is a visual representation of a portion of the node-link model depicted in FIG. 21, according to the third use case.

Similarly, FIG. 34 depicts a graphical representation of a partial node-link model 3400 created based on the data table 3320, responsive to the user's definition of focus node, viewable scope, and viewable fields, as depicted in FIG. 31.

As shown, the partial node-link model 3400 includes 7 candidate nodes (Nodes 5-11) connected by the links, while the other 14 candidate nodes in the data table 3140 (e.g., candidate nodes with node_id=1-4 and 12-19) are not displayed because they are outside the viewable scope. As indicated in the data table 3320, while each of the nodes 5 and 7-10 represents only one respective object, node 6 represents two different A.H. objects and node 11 represents three different U.R. objects. In addition, each node displays the corresponding object identifier but no segment identifier (because the segment identifier is excluded from the viewable fields).

Similarly, the links characterize parent-child relationship between the nodes and the objects they represent. For example, Node t is the parent of Node 6, which is the parent of Node 7, etc. The sender-receiver relationship between the nodes can be color or pattern coded. In the depicted example, the shaded nodes (e.g., Nodes 5, 7, 9, and 11) represent senders, and the unshaded nodes (Nodes 6, 8, and 10) represent receivers. Likewise, positive value distributions assigned to links that represent sender-receiver relationship between the connected nodes are shown next to those links, and value distributions assigned to nodes can be displayed in the nodes.

Thus, the partial node-link model 3400 provides a more focused view of the node-link model 2100, centered on the newly selected focus node (i.e., Node 6 in FIG. 30). The viewable scope specified by the user determines which neighboring nodes of the focus node can be displayed.

Example 17—Example Advantages

Figure 35:
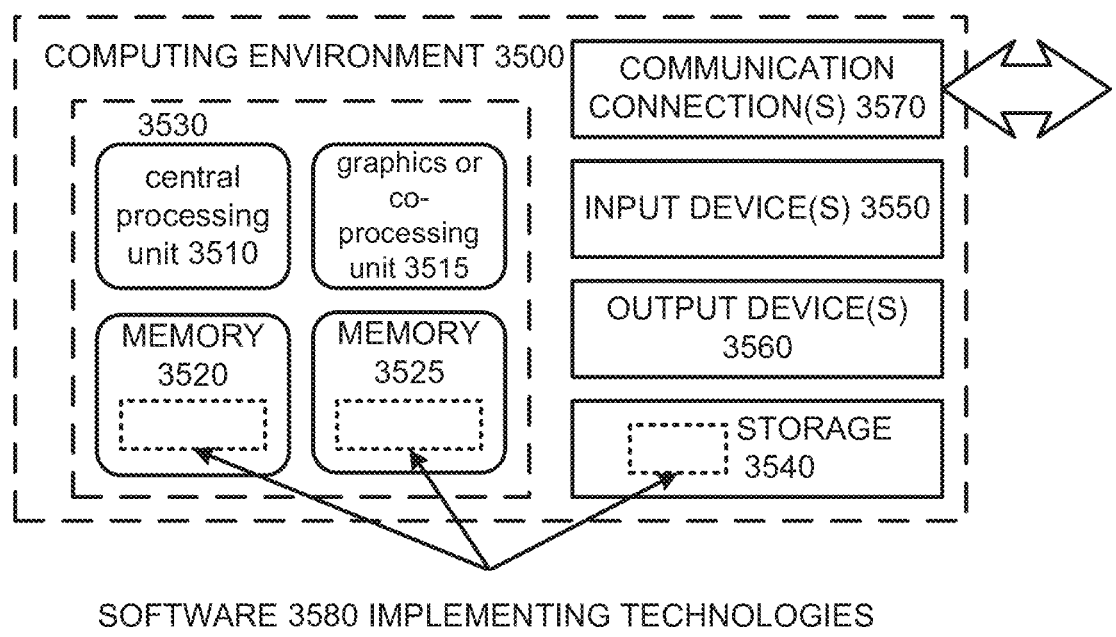
FIG. 35 is a block diagram of an example computing system in which described embodiments can be implemented.

A number of advantages can be achieved via the technology described herein. For example, the technologies described herein allows visualizing complex value distributions in cycle definitions through an intuitive node-link model. The node-link model includes nodes that represent objects in an organization involved in the value distributions and links that represent values distributed between the objects. A user can interactively manipulate the node-link model to select any of the nodes as a focus node, and specify a viewable scope to determine which neighboring nodes of the focus node can be displayed. The user can also specify viewable fields to control what information can be displayed in the nodes. Thus, the user can interactively and dynamically adjust the visual representation of the node-link model to focus on area of interests and control the amount of data presented so that the user can understand and digest information in a scalable manner Example 18—Example Computing Systems FIG. 35 depicts an example of a suitable computing system 3500 in which the described innovations can be implemented. The computing system 3500 is not intended to suggest any limitation as to scope of use or functionality of the present disclosure, as the innovations can be implemented in diverse computing systems.

With reference to FIG. 35, the computing system 3500 includes one or more processing units 3510, 3515 and memory 3520, 3525. In FIG. 35, this basic configuration 3530 is included within a dashed line. The processing units 3510, 3515 can execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 35 shows a central processing unit 3510 as well as a graphics processing unit or co-processing unit 3515. The tangible memory 3520, 3525 can be volatile memory (e.g., registers, cache, RAM), non-volatile memory (e.g., ROM, EEPROM, flash memory, etc.), or some combination of the two, accessible by the processing unit(s) 3510, 3515. The memory 3520, 3525 can store software 3580 implementing one or more innovations described herein, in the form of computer-executable instructions suitable for execution by the processing unit(s) 3510, 3515.

A computing system 3500 can have additional features. For example, the computing system 3500 can include storage 3540, one or more input devices 3550, one or more output devices 3560, and one or more communication connections 3570, including input devices, output devices, and communication connections for interacting with a user. An interconnection mechanism (not shown) such as a bus, controller, or network can interconnect the components of the computing system 3500. Typically, operating system software (not shown) can provide an operating environment for other software executing in the computing system 3500, and coordinate activities of the components of the computing system 3500.

The tangible storage 3540 can be removable or non-removable, and includes magnetic disks, magnetic tapes or cassettes, CD-ROMs, DVDs, or any other medium which can be used to store information in a non-transitory way and which can be accessed within the computing system 3500. The storage 3540 can store instructions for the software 280 implementing one or more innovations described herein.

The input device(s) 3550 can be an input device such as a keyboard, mouse, pen, or trackball, a voice input device, a scanning device, touch device (e.g., touchpad, display, or the like) or another device that provides input to the computing system 3500. The output device(s) 3560 can be a display, printer, speaker, CD-writer, or another device that provides output from the computing system 3500.

The communication connection(s) 3570 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 19—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 20—Example Cloud Computing Environment

Figure 36:
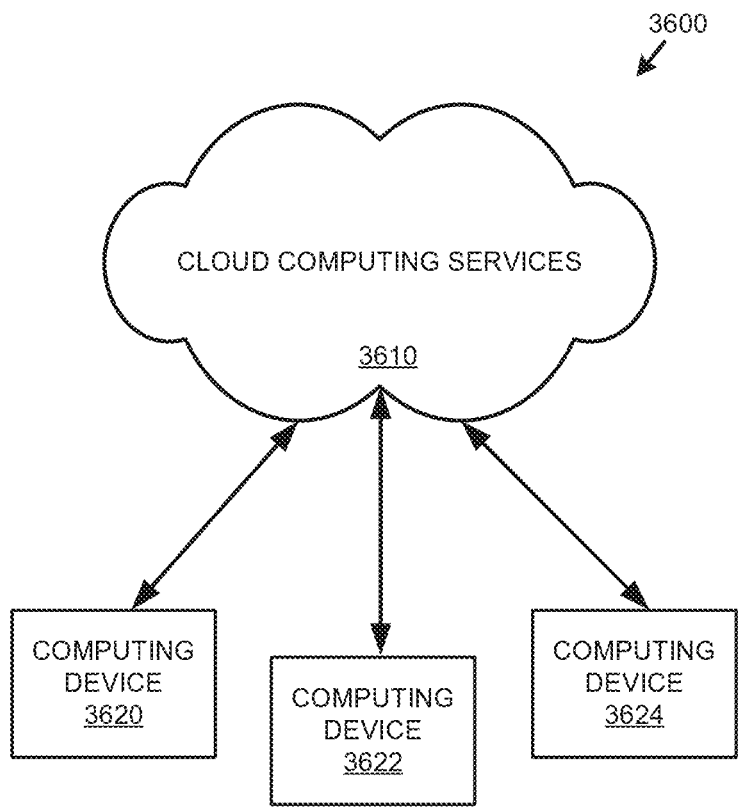
FIG. 36 is a block diagram of an example cloud computing environment that can be used in conjunction with the technologies described herein.

FIG. 36 depicts an example cloud computing environment 3600 in which the described technologies can be implemented, including, e.g., the system disclosed above and other systems herein. The cloud computing environment 3600 can include cloud computing services 3610. The cloud computing services 3610 can comprise various types of cloud computing resources, such as computer servers, data storage repositories, networking resources, etc. The cloud computing services 3610 can be centrally located (e.g., provided by a data center of a business or organization) or distributed (e.g., provided by various computing resources located at different locations, such as different data centers and/or located in different cities or countries).

The cloud computing services 3610 can be utilized by various types of computing devices (e.g., client computing devices), such as computing devices 3620, 3622, and 3623. For example, the computing devices (e.g., 3620, 3622, and 3624) can be computers (e.g., desktop or laptop computers), mobile devices (e.g., tablet computers or smart phones), or other types of computing devices. For example, the computing devices (e.g., 3620, 3622, and 3624) can utilize the cloud computing services 3610 to perform computing operations (e.g., data processing, data storage, and the like).

In practice, cloud-based, on-premises-based, or hybrid scenarios can be supported.

Example 21—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example 22—Example Embodiments

Any of the following embodiments can be implemented.

Clause 1. A computer-implemented method comprising: receiving a search query to search a database table comprising data values organized in a plurality of rows and a plurality of columns, the search query comprising one or more search entries, wherein the one or more search entries specify column names and search criteria associated with the column names; generating a plurality of hash tables corresponding to selected columns of the database table, wherein a hash table comprises one or more hash values and one or more tuples respectively mapped to the one or more hash values, wherein the one or more hash values are unique data values in a selected column of the database table, wherein a tuple comprises one or more row indexes corresponding to a specific hash value; and responsive to the search query, searching the plurality of hash tables to identify result row indexes, wherein the result row indexes and the column names specified by the one or more search entries locate data values in the database table that satisfy the search criteria specified by the one or more search entries.

Clause 2. The method of clause 1, wherein generating the plurality of hash tables comprises: parsing the database table to identify unique data values in selected columns of the database table; and determining row indexes corresponding to the identified unique data values in selected columns of the database table.

Clause 3. The method of any one of clauses 1-2, wherein the searching comprises identifying hash tables corresponding to column names specified by the one or more search entries.

Clause 4. The method of clause 3, wherein the searching comprises identifying hash values in the identified hash tables that match the search criteria specified by the one or more search entries.

Clause 5. The method of clause 4, wherein the searching comprises retrieving tuples mapped to the identified hash values from the identified hash tables.

Clause 6. The method of clause 5, wherein the searching comprises: counting numbers of row indexes contained in the retrieved tuples in the identified hash tables; and ordering the identified hash tables based on the counted numbers.

Clause 7. The method of any one of clauses 5-6, wherein the search query comprises at least a first search entry and a second search entry, wherein the retrieved tuples comprise first tuples corresponding to the first search entry and second tuples corresponding to the second search entry, wherein the searching comprises identifying common row indexes that are shared by the first tuples and the second tuples, and returning the common row indexes as the target row indexes.

Clause 8. The method of clause 7, wherein identifying the common row indexes comprises looping through the first tuples in an outer loop and looping through the second tuples in an inner loop nested inside the outer loop if the second tuples has more row indexes than the first tuples, or looping through the second tuples in an outer loop and looping through the first tuples in an inner loop nested inside the outer loop if the first tuples has more row indexes than the second tuples.

Clause 9. The method of any one of clauses 1-8, further comprising generating the search query based on a request to find specific data values in the database table, wherein generating the search query comprises specifying the column names and formulating the search criteria associated with the column names Clause 10. A computing system comprising: memory; one or more hardware processors coupled to the memory; and one or more computer readable storage media storing instructions that, when loaded into the memory, cause the one or more hardware processors to perform operations comprising: receiving a search query to search a database table comprising data values organized in a plurality of rows and a plurality of columns, the search query comprising one or more search entries, wherein the one or more search entries specify column names and search criteria associated with the column names; generating a plurality of hash tables corresponding to selected columns of the database table, wherein a hash table comprises one or more hash values and one or more tuples respectively mapped to the one or more hash values, wherein the one or more hash values are unique data values in a selected column of the database table, wherein a tuple comprises one or more row indexes corresponding to a specific hash value; and responsive to the search query, searching the plurality of hash tables to identify result row indexes, wherein the result row indexes and the column names specified by the one or more search entries locate data values in the database table that satisfy the search criteria specified by the one or more search entries.

Clause 11. The system of clause 10, wherein generating the plurality of hash tables comprises: parsing the database table to identify unique data values in selected columns of the database table; and determining row indexes corresponding to the identified unique data values in selected columns of the database table.

Clause 12. The system of clause 11, wherein the searching comprises identifying hash tables corresponding to column names specified by the one or more search entries.

Clause 13. The system of clause 12, wherein the searching comprises identifying hash values in the identified hash tables that match the search criteria specified by the one or more search entries.

Clause 14. The system of clause 13, wherein the searching comprises retrieving tuples mapped to the identified hash values from the identified hash tables.

Clause 15. The system of clause 14, wherein the searching comprises: counting numbers of row indexes contained in the retrieved tuples in the identified hash tables; and ordering the identified hash tables based on the counted numbers.

Clause 16. The system of any one of clauses 13-15, wherein the search query comprises at least a first search entry and a second search entry, wherein the retrieved tuples comprise first tuples corresponding to the first search entry and second tuples corresponding to the second search entry, wherein the searching comprises identifying common row indexes that are shared by the first tuples and the second tuples, and returning the common row indexes as the target row indexes.

Clause 17. The system of clause 16, wherein identifying the common row indexes comprises looping through the first tuples in an outer loop and looping through the second tuples in an inner loop nested inside the outer loop if the second tuples has more row indexes than the first tuples, or looping through the second tuples in an outer loop and looping through the first tuples in an inner loop nested inside the outer loop if the first tuples has more row indexes than the second tuples.

Clause 18. One or more non-transitory computer-readable media having encoded thereon computer-executable instructions causing one or more processors to perform a method comprising: receiving a search query to search a database table comprising data values organized in a plurality of rows and a plurality of columns, the search query comprising one or more search entries, wherein the one or more search entries specify column names and search criteria associated with the column names; generating a plurality of hash tables corresponding to selected columns of the database table, wherein a hash table comprises one or more hash values and one or more tuples respectively mapped to the one or more hash values, wherein the one or more hash values are unique data values in a selected column of the database table, wherein a tuple comprises one or more row indexes corresponding to a specific hash value; and responsive to the search query, searching the plurality of hash tables to identify result row indexes, wherein the result row indexes and the column names specified by the one or more search entries locate data values in the database table that satisfy the search criteria specified by the one or more search entries, wherein the searching comprises: identifying hash tables corresponding to column names specified by the one or more search entries; identifying hash values in the identified hash tables that match the search criteria specified by the one or more search entries; retrieving tuples mapped to the identified hash values from the identified hash tables; and identifying the target row indexes from the retrieved tuples.

Clause 19. The one or more non-transitory computer-readable media of clause 18, wherein the search query comprises at least a first search entry and a second search entry, wherein the retrieved tuples comprise first tuples corresponding to the first search entry and second tuples corresponding to the second search entry, wherein the target row indexes are identified as common row indexes that are shared by the first tuples and the second tuples.

Clause 20. The one or more non-transitory computer-readable media of clause 19, wherein identifying the target row indexes comprises looping through the first tuples in an outer loop and looping through the second tuples in an inner loop nested inside the outer loop if the second tuples has more row indexes than the first tuples, or looping through the second tuples in an outer loop and looping through the first tuples in an inner loop nested inside the outer loop if the first tuples has more row indexes than the second tuples.

Example 23—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computer-implemented method for improving performance of searching database tables, the method comprising:
receiving a search query to search a database table comprising data values organized in a plurality of rows and a plurality of columns, the search query comprising a plurality of search entries, wherein the plurality of search entries respectively specify column names and search criteria associated with the column names;
generating a plurality of hash tables corresponding to selected columns of the database table, wherein generating a hash table corresponding to a selected column of the database table comprises determining one or more hash values and one or more tuples respectively mapped to the one or more hash values, wherein determining the one or more hash values comprises identifying unique data values in the selected column of the database table, wherein determining a tuple mapped to a specific hash value comprises identifying one or more row indexes corresponding to the specific hash value; and
responsive to the search query, searching the plurality of hash tables to identify result row indexes, wherein the result row indexes and the column names specified by the plurality of search entries locate data values in the database table that satisfy the search criteria specified by the plurality of search entries,
wherein the plurality of search entries comprises a first search entry and a second search entry, wherein the searching comprises:
identifying one or more first tuples corresponding to the first search entry and identifying one or more second tuples corresponding to the second search entry;
finding common row indexes that are shared by the one or more first tuples and the one or more second tuples; and
returning the common row indexes as the result row indexes,
wherein finding common row indexes comprises:
determining a first cardinality of the one or more first tuples and a second cardinality of the one or more second tuples, wherein determining a cardinality of one or more tuples comprises determining a size for each tuple and summing the sizes for the one or more tuples; and
looping through the one or more first tuples in an outer loop and looping through the one or more second tuples in an inner loop nested inside the outer loop if the first cardinality is smaller than the second cardinality, or looping through the one or more second tuples in an outer loop and looping through the one or more first tuples in an inner loop nested inside the outer loop if the first cardinality is larger than the second cardinality,
wherein if a specific row index is not in the outer loop, skip searching the specific row index in the inner loop.

2. The method of claim 1, wherein no hash table is generated for at least one column of the database table.

3. The method of claim 1, wherein the searching comprises identifying hash tables corresponding to column names specified by the plurality of search entries.

4. The method of claim 3, wherein the searching comprises identifying hash values in the identified hash tables that match the search criteria specified by the plurality of search entries.

5. The method of claim 4, wherein the searching comprises retrieving tuples mapped to the identified hash values from the identified hash tables.

6. The method of claim 5, wherein the searching comprises:
counting numbers of row indexes contained in the retrieved tuples in the identified hash tables; and
ordering the identified hash tables based on the counted numbers.

7. The method of claim 1, further comprising generating the search query based on a request to find specific data values in the database table, wherein generating the search query comprises specifying the column names and formulating the search criteria associated with the column names.

8. A computing system for improving performance of searching database tables, the system comprising:
- memory;
- one or more hardware processors coupled to the memory; and
- one or more computer readable storage media storing instructions that, when loaded into the memory, cause the one or more hardware processors to perform operations comprising:
- receiving a search query to search a database table comprising data values organized in a plurality of rows and a plurality of columns, the search query comprising a plurality of search entries, wherein the plurality of search entries respectively specify column names and search criteria associated with the column names;
- generating a plurality of hash tables corresponding to selected columns of the database table, wherein generating a hash table corresponding to a selected column of the database table comprises determining one or more hash values and one or more tuples respectively mapped to the one or more hash values, wherein determining the one or more hash values comprises identifying unique data values in the selected column of the database table, wherein determining a tuple mapped to a specific hash value comprises identifying one or more row indexes corresponding to the specific hash value; and
- responsive to the search query, searching the plurality of hash tables to identify result row indexes, wherein the result row indexes and the column names specified by the plurality of search entries locate data values in the database table that satisfy the search criteria specified by the plurality of search entries,
- wherein the plurality of search entries comprises a first search entry and a second search entry, wherein the searching comprises:
- identifying one or more first tuples corresponding to the first search entry and identifying one or more second tuples corresponding to the second search entry;
- finding common row indexes that are shared by the one or more first tuples and the one or more second tuples; and
- returning the common row indexes as the result row indexes,
- wherein finding common row indexes comprises:
- determining a first cardinality of the one or more first tuples and a second cardinality of the one or more second tuples, wherein determining a cardinality of one or more tuples comprises determining a size for each tuple and summing the sizes for the one or more tuples; and
- looping through the one or more first tuples in an outer loop and looping through the one or more second tuples in an inner loop nested inside the outer loop if the first cardinality is smaller than the second cardinality, or looping through the one or more second tuples in an outer loop and looping through the one or more first tuples in an inner loop nested inside the outer loop if the first cardinality is larger than the second cardinality,
- wherein if a specific row index is not in the outer loop, skip searching the specific row index in the inner loop.

9. The system of claim 8, wherein no hash table is generated for at least one column of the database table.

10. The system of claim 8, wherein the searching comprises identifying hash tables corresponding to column names specified by the plurality of search entries.

11. The system of claim 10, wherein the searching comprises identifying hash values in the identified hash tables that match the search criteria specified by the plurality of search entries.

12. The system of claim 11, wherein the searching comprises retrieving tuples mapped to the identified hash values from the identified hash tables.

13. The system of claim 12, wherein the searching comprises:
- counting numbers of row indexes contained in the retrieved tuples in the identified hash tables; and
- ordering the identified hash tables based on the counted numbers.

14. One or more non-transitory computer-readable media having encoded thereon computer-executable instructions causing one or more processors to perform a method for improving performance of searching database tables, the method comprising:
- receiving a search query to search a database table comprising data values organized in a plurality of rows and a plurality of columns, the search query comprising a plurality of search entries, wherein the plurality of search entries respectively specify column names and search criteria associated with the column names;
- generating a plurality of hash tables corresponding to selected columns of the database table, wherein generating a hash table corresponding to a selected column of the database table comprises determining one or more hash values and one or more tuples respectively mapped to the one or more hash values, wherein determining the one or more hash values comprises identifying unique data values in the selected column of the database table, wherein determining a tuple mapped to a specific hash value comprises identifying one or more row indexes corresponding to the specific hash value; and
- responsive to the search query, searching the plurality of hash tables to identify result row indexes, wherein the result row indexes and the column names specified by the plurality of search entries locate data values in the database table that satisfy the search criteria specified by the plurality of search entries,
- wherein the plurality of search entries comprises a first search entry and a second search entry, wherein the searching comprises:
- identifying one or more first tuples corresponding to the first search entry and identifying one or more second tuples corresponding to the second search entry;
- finding common row indexes that are shared by the one or more first tuples and the one or more second tuples; and
- returning the common row indexes as the result row indexes,
- wherein finding common row indexes comprises:
- determining a first cardinality of the one or more first tuples and a second cardinality of the one or more second tuples, wherein determining a cardinality of one or more tuples comprises determining a size for each tuple and summing the sizes for the one or more tuples; and
- looping through the one or more first tuples in an outer loop and looping through the one or more second tuples in an inner loop nested inside the outer loop if the first cardinality is smaller than the second cardinality, or looping through the one or more second tuples in an outer loop and looping through the one or more first tuples in an inner loop nested inside the outer loop if the first cardinality is larger than the second cardinality, wherein if a specific row index is not in the outer loop, skip searching the specific row index in the inner loop.

15. The one or more non-transitory computer-readable media of claim 14, wherein determining a cardinality of one or more tuples comprises determining a size for each tuple and summing the sizes for the one or more tuples.

* * * * *